(12) United States Patent
Kodama et al.

(10) Patent No.: US 11,513,395 B1
(45) Date of Patent: Nov. 29, 2022

(54) BANDPASS FILTER COMPRISING FIRST AND SECOND REFLECTIVE MEMBERS EACH HAVING A PLURALITY OF CHOLESTERIC LIQUID CRYSTAL LAYERS AND SENSOR HAVING THE SAME

(71) Applicant: FUJIFILM Corporation, Tokyo (JP)

(72) Inventors: Keisuke Kodama, Minamiashigara (JP); Yujiro Yanai, Minamiashigara (JP); Takeharu Tani, Minamiashigara (JP); Shunya Katoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/828,540

(22) Filed: May 31, 2022

(30) Foreign Application Priority Data

Jun. 2, 2021 (JP) .............................. JP2021-092770

(51) Int. Cl.
*G02F 1/13363* (2006.01)
*G02F 1/137* (2006.01)
*G01J 1/04* (2006.01)

(52) U.S. Cl.
CPC ........ *G02F 1/13363* (2013.01); *G01J 1/0437* (2013.01); *G02F 1/13718* (2013.01)

(58) Field of Classification Search
CPC .............. G01J 1/0437; G02F 2201/343; G02F 1/133543; G02F 1/13478
See application file for complete search history.

(56) References Cited

U.S. PATENT DOCUMENTS

| | | | |
|---|---|---|---|
| 2004/0085660 A1* | 5/2004 | Hara | G02B 5/287 |
| | | | 359/883 |
| 2004/0090577 A1* | 5/2004 | Hara | G02F 1/133509 |
| | | | 349/117 |
| 2006/0127605 A1* | 6/2006 | Takeda | G02B 5/3016 |
| | | | 428/1.3 |

FOREIGN PATENT DOCUMENTS

| | | | | |
|---|---|---|---|---|
| JP | 2003-344634 A | 12/2003 | | |
| WO | WO-2010038183 A1 * | 4/2010 | | G01J 3/02 |
| WO | WO-2019013466 A1 * | 1/2019 | | G02B 27/14 |

* cited by examiner

*Primary Examiner* — Paul C Lee
(74) *Attorney, Agent, or Firm* — Birch, Stewart, Kolasch & Birch, LLP

(57) ABSTRACT

Provided are a bandpass filter having a high light transmittance in a transmission band and a wide wavelength range showing a high transmittance in the transmission band, and a sensor. The bandpass filter is a bandpass filter including a reflective member A and a reflective member B, in which a difference between a reflection center wavelength of the reflective member A and a reflection center wavelength of the reflective member B is larger than a sum of a half width at half maximum of a reflection band of the reflective member A and a half width at half maximum of a reflection band of the reflective member B; the reflective member A has a first cholesteric liquid crystal layer and a second cholesteric liquid crystal layer, and birefringence $\Delta n1$ of the first cholesteric liquid crystal layer is larger than birefringence $\Delta n2$ of the second cholesteric liquid crystal layer; and the reflective member B has a third cholesteric liquid crystal layer and a fourth cholesteric liquid crystal layer, and birefringence $\Delta n3$ of the third cholesteric liquid crystal layer is larger than birefringence $\Delta n4$ of the fourth cholesteric liquid crystal layer.

8 Claims, 2 Drawing Sheets

BANDPASS FILTER COMPRISING FIRST AND SECOND REFLECTIVE MEMBERS EACH HAVING A PLURALITY OF CHOLESTERIC LIQUID CRYSTAL LAYERS AND SENSOR HAVING THE SAME

CROSS-REFERENCE TO RELATED APPLICATIONS

The present application claims priority under 35 U.S.C. § 119 to Japanese Patent Application No. 2021-092770 filed on Jun. 2, 2021. The above application is hereby expressly incorporated by reference, in its entirety, into the present application.

BACKGROUND OF THE INVENTION

1. Field of the Invention

The present invention relates to a bandpass filter and a sensor.

2. Description of the Related Art

The bandpass filter can transmit light in a predetermined wavelength range and is applied to various optical sensors. By using such a bandpass filter, for example, among the light emitted by a light source included in an optical sensor, only the light reflected by an object can be selectively transmitted and received by various elements.

The optical sensor to which the bandpass filter is applied may be, for example, a distance-measuring sensor (depth sensor) for measuring the distance to an object, for motion capture, automated driving of a motor vehicle, automated control of a robot, and the like.

For example, JP2003-344634A proposes a bandpass filter using a reflective film utilizing the selective reflection characteristics of a cholesteric liquid crystalline phase.

SUMMARY OF THE INVENTION

In recent years, further improvement in accuracy of measurement by an optical sensor has been required. More specifically, it is required to increase an amount of light received by the optical sensor to improve a signal-to-noise ratio (SN ratio) by improving the transmission performance of the bandpass filter used in the optical sensor.

Therefore, the present inventors have studied the transmission performance of a bandpass filter having a plurality of cholesteric liquid crystal layers consisting of cholesteric liquid crystalline phases having different selective reflection wavelength ranges, with reference to the aspect described in JP2003-344634A and then have found that the transmittance of light in the transmission band of the bandpass filter is not always high, and the wavelength range showing a high transmittance in the transmission band is not necessarily wide, so that the transmission performance of the bandpass filter needs to be further improved.

The present invention has been made in view of the above circumstances, and an object of the present invention is to provide a bandpass filter having a high light transmittance in a transmission band and a large proportion of a region having a high light transmittance in the transmission band, and a sensor.

As a result of extensive studies on the foregoing objects, the present inventors have found that the foregoing objects can be achieved by the following configurations.

[1] A bandpass filter including a reflective member A and a reflective member B, in which a difference between a reflection center wavelength of the reflective member A and a reflection center wavelength of the reflective member B is larger than a sum of a half width at half maximum of a reflection band of the reflective member A and a half width at half maximum of a reflection band of the reflective member B; the reflective member A has a first cholesteric liquid crystal layer and a second cholesteric liquid crystal layer, and birefringence $\Delta n1$ of the first cholesteric liquid crystal layer is larger than birefringence $\Delta n2$ of the second cholesteric liquid crystal layer; and the reflective member B has a third cholesteric liquid crystal layer and a fourth cholesteric liquid crystal layer, and birefringence $\Delta n3$ of the third cholesteric liquid crystal layer is larger than birefringence $\Delta n4$ of the fourth cholesteric liquid crystal layer.

[2] The bandpass filter according to [1], in which a ratio of the birefringence $\Delta n2$ to the birefringence $\Delta n1$ is more than 0.3 and less than 0.7, and a ratio of the birefringence $\Delta n4$ to the birefringence $\Delta n3$ is more than 0.3 and less than 0.7.

[3] The bandpass filter according to [1] or [2], in which a ratio of a thickness $d2$ of the second cholesteric liquid crystal layer to a thickness $d1$ of the first cholesteric liquid crystal layer is 0.1 to 1.0, and a ratio of a thickness $d4$ of the fourth cholesteric liquid crystal layer to a thickness $d3$ of the third cholesteric liquid crystal layer is 0.1 to 1.0.

[4] The bandpass filter according to any one of [1] to [3], in which the reflection center wavelength of the reflective member A and the reflection center wavelength of the reflective member B are both 600 nm or more.

[5] The bandpass filter according to any one of [1] to [4], in which a full width at half maximum of a transmission band of the bandpass filter existing between the reflection band of the reflective member A and the reflection band of the reflective member B is included in a range of 1.5% to 15.0% of a transmission center wavelength of the transmission band.

[6] The bandpass filter according to any one of [1] to [5], in which a thermal expansion coefficient of the first cholesteric liquid crystal layer is 50 ppm/°C. or more, and a thermal expansion coefficient of the third cholesteric liquid crystal layer is 50 ppm/°C. or more.

[7] The bandpass filter according to any one of [1] to [6], in which a reflection center wavelength $\lambda_A$ of the reflective member A and a reflection center wavelength $\lambda_B$ of the reflective member B increase as a distance from a central portion increases in at least one in-plane direction.

[8] A sensor including a light source, the bandpass filter according to any one of [1] to [7] that transmits light having an emission peak wavelength of the light source, and a light-receiving element that receives the light transmitted by the bandpass filter.

According to an aspect of the present invention, it is possible to provide a bandpass filter having a high light transmittance in a transmission band and a large proportion of a region having a high light transmittance in the transmission band, and a sensor.

DESCRIPTION OF THE PREFERRED EMBODIMENTS

Hereinafter, the bandpass filter according to the embodiment of the present invention will be described in detail with reference to suitable examples shown in the accompanying drawings.

In the present specification, any numerical range expressed by using "to" means a range including the numerical values before and after the "to" as a lower limit value and an upper limit value, respectively.

In the present specification, the term "(meth)acrylate" is used to mean "either or both of acrylate and methacrylate".

In the present specification, visible light is light having a wavelength visible to the human eye among electromagnetic waves, and is light in a wavelength range of 380 to 780 nm. Ultraviolet light is light in a wavelength range of 10 nm or more and less than 380 nm, and infrared light is light in a wavelength range of more than 780 nm.

Bandpass Filter

The bandpass filter according to the embodiment of the present invention (hereinafter, also simply referred to as "bandpass filter") has a reflective member A and a reflective member B.

In the reflective member A and the reflective member B, the difference between the reflection center wavelength of the reflective member A and the reflection center wavelength of the reflective member B is larger than a sum of the half width at half maximum of the reflection band of the reflective member A and the half width at half maximum of the reflection band of the reflective member B.

Further, the reflective member A has a first cholesteric liquid crystal layer and a second cholesteric liquid crystal layer, and the birefringence $\Delta n1$ of the first cholesteric liquid crystal layer is larger than the birefringence $\Delta n2$ of the second cholesteric liquid crystal layer, and the reflective member B has a third cholesteric liquid crystal layer and a fourth cholesteric liquid crystal layer, and the birefringence $\Delta n3$ of the third cholesteric liquid crystal layer is larger than the birefringence $\Delta n4$ of the fourth cholesteric liquid crystal layer.

Hereinafter, the bandpass filter according to the embodiment of the present invention will be described with reference to the accompanying drawings.

Figure 1:
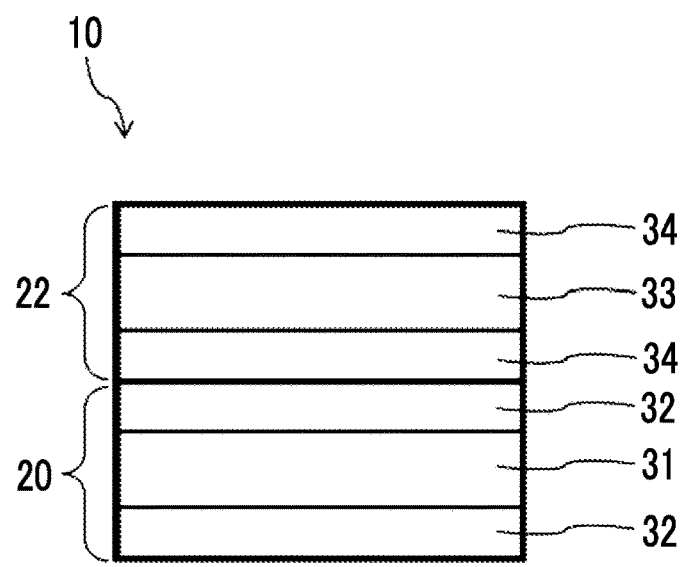
FIG. 1 is a conceptual diagram showing an example of a configuration of a bandpass filter according to the present invention.

FIG. 1 is a conceptual diagram showing an example of the configuration of the bandpass filter according to the embodiment of the present invention. FIG. 1 shows the configuration of each layer in the cross section in the thickness direction (lamination direction) of the bandpass filter.

In FIG. 1, a bandpass filter 10 has a reflective member A 20 and a reflective member B 22.

The reflective member A 20 is composed of a set of laminates consisting of a first cholesteric liquid crystal layer 31 and a second cholesteric liquid crystal layer 32 arranged on both surfaces (two main surfaces) of the first cholesteric liquid crystal layer 31.

The reflective member B 22 is composed of a set of laminates consisting of a third cholesteric liquid crystal layer 33 and a fourth cholesteric liquid crystal layer 34 arranged on both surfaces (two main surfaces) of the third cholesteric liquid crystal layer 33.

The configuration of the bandpass filter according to the embodiment of the present invention is not limited to the aspect shown in FIG. 1.

For example, the bandpass filter according to the embodiment of the present invention may have at least one set of laminates $A_R$ having a first cholesteric liquid crystal layer and a second cholesteric liquid crystal layer and having selective reflection characteristics of dextrorotatory circularly polarized light, and at least one set of laminates $A_L$ having a first cholesteric liquid crystal layer and a second cholesteric liquid crystal layer and having selective reflection characteristics of levorotatory circularly polarized light, as the reflective member A.

In addition, the bandpass filter according to the embodiment of the present invention may have at least one set of laminates $B_R$ having a third cholesteric liquid crystal layer and a fourth cholesteric liquid crystal layer and having selective reflection characteristics of dextrorotatory circularly polarized light, and at least one set of laminates $B_L$ having a third cholesteric liquid crystal layer and a fourth cholesteric liquid crystal layer and having selective reflection characteristics of levorotatory circularly polarized light, as the reflective member B.

The selective reflection characteristics of dextrorotatory circularly polarized light or levorotatory circularly polarized light in each cholesteric liquid crystal layer and each laminate will be described later.

Figure 2:
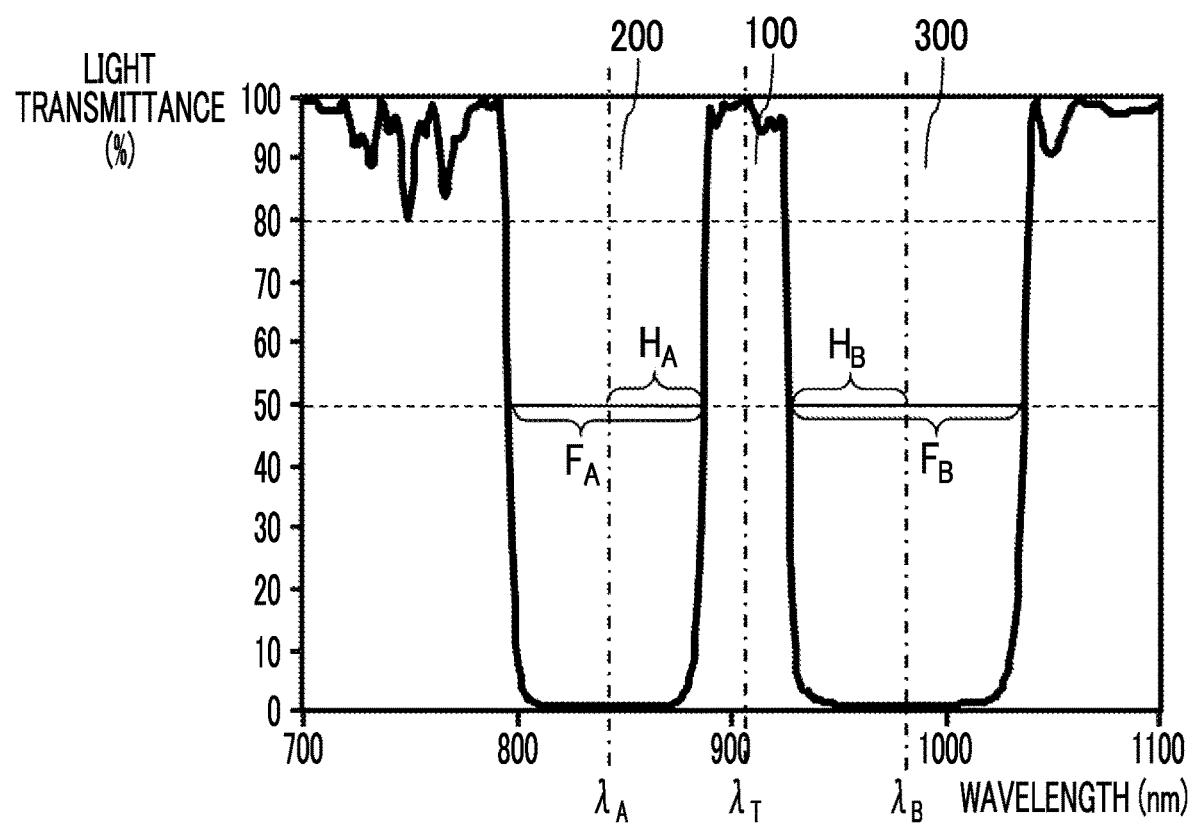
FIG. 2 is a graph conceptually showing an example of optical characteristics of the bandpass filter according to the present invention.

FIG. 2 is a graph conceptually showing an example of the optical characteristics of the bandpass filter according to the embodiment of the present invention.

In FIG. 2, the lateral axis represents a wavelength and the vertical axis represents a light transmittance. FIG. 2 shows the transmission spectrum of the bandpass filter that has the laminate $A_R$ and the laminate $A_L$ as the reflective member A, and has the laminate $B_R$ and the laminate $B_L$ as the reflective member B.

As shown in FIG. 2, the transmission spectrum of the bandpass filter having such a configuration includes a reflection band 200, which is derived from the reflective member A and reflects light having a wavelength close to the reflection center wavelength $\lambda_A$, a reflection band 300, which is derived from the reflective member B and reflects light having a wavelength close to the reflection center wavelength $\lambda_B$, and a transmission band 100 sandwiched between the reflection band 200 and the reflection band 300.

In addition, FIG. 2 shows the reflection center wavelength $\lambda_A$, the full width at half maximum $F_A$, and the half width at half maximum $H_A$ of the reflection band 200 derived from the reflective member A, and the reflection center wavelength $\lambda_B$, the full width at half maximum $F_B$, and the half width at half maximum $H_B$ of the reflection band 300 derived from the reflective member B.

In the present specification, the full width at half maximum (also simply referred to as "half-width") means the difference (unit: nm) between two wavelengths showing a light transmittance of 50% in the transmission spectrum of a target object (member), and the half width at half maximum means a value (unit: nm) obtained by dividing the full width at half maximum into two equal parts. In addition, in the present specification, the reflection center wavelength means an arithmetic mean value (unit: nm) of two wavelengths showing a light transmittance of 50% in the transmission spectrum of a target object (member).

As shown in FIG. 2, the bandpass filter according to the embodiment of the present invention is characterized in that the difference ($|\lambda_A - \lambda_B|$) between the reflection center wavelength $\lambda_A$ of the reflective member A and the reflection center wavelength $\lambda_B$ of the reflective member B is larger than the sum of the half width at half maximum $H_A$ of the reflection band 200 of the reflective member A and the half width at half maximum $H_B$ of the reflection band 300 of the reflective member B. That is, the bandpass filter according to the embodiment of the present invention satisfies Expression (1).

$$|\lambda_A - \lambda_B| > H_A + H_B \qquad (1)$$

Satisfying Expression (1) makes it possible to exert a function as a bandpass filter that reflects light having a wavelength included in the reflection band 200 and the reflection band 300, and transmits light having a wavelength included in the transmission band 100 sandwiched between the reflection band 200 and the reflection band 300.

It should be noted that, in a case where a minimum value $T_{min}$ (%) of the light transmittance in the object (member) is more than 0%, such as in a case where each reflective member of the bandpass filter is composed of only a laminate for dextrorotatory circularly polarized light or levorotatory circularly polarized light, the full width at half maximum of the reflection band can be obtained as the difference (unit: nm) between two wavelengths indicating a half-value light transmittance: $T_{1/2}$ (%) represented by the following expression, and the half width at half maximum and the reflection center wavelength can be obtained from the obtained full width at half maximum.

Expression for calculating half-value light transmittance: $T_{1/2} = 100 - (100 - T_{min})/2$ Further, the bandpass filter according to the embodiment of the present invention satisfies the requirement that the reflective member A has a first cholesteric liquid crystal layer and a second cholesteric liquid crystal layer, and the birefringence $\Delta n1$ of the first cholesteric liquid crystal layer is larger than the birefringence $\Delta n2$ of the second cholesteric liquid crystal layer, and the reflective member B has a third cholesteric liquid crystal layer and a fourth cholesteric liquid crystal layer, and the birefringence $\Delta n3$ of the third cholesteric liquid crystal layer is larger than the birefringence $\Delta n4$ of the fourth cholesteric liquid crystal layer. The bandpass filter according to the embodiment of the present invention can have an effect that the light transmittance of the transmission band is high and the proportion of the region having a high light transmittance in the transmission band is large, because each of the reflective members A and B has a plurality of cholesteric liquid crystal layers having different birefringence $\Delta n$.

Hereinafter, in the bandpass filter, the fact that a ratio of a wavelength range having a high light transmittance to an entire wavelength range of a transmission band is large is also referred to as "a high transmission band ratio is large", and the fact that a light transmittance of a transmission band is high and/or a high transmission band ratio of a transmission band is large is also referred to as "the effect of the present invention is excellent".

The following reasons can be considered as detailed reasons why the effect of the present invention can be obtained by satisfying the above requirement. By laminating a plurality of reflective layers consisting of cholesteric liquid crystal layers to form a plurality of reflection bands derived from each reflective layer (cholesteric liquid crystalline phase), a bandpass filter can be obtained that reflects light having a wavelength included in each reflection band and transmits light having a wavelength included in the transmission band sandwiched between the plurality of reflection bands. In each reflection band of this bandpass filter, a region (side lobe) that reflects light may also occur near the outside of the desired reflection band. It is considered that the occurrence of the side lobe in the reflection band leads to a decrease in the light transmittance of light in the transmission band sandwiched between the reflection bands, which contributes to a decrease in the transmission characteristics of the bandpass filter.

On the other hand, in the bandpass filter according to the embodiment of the present invention, each of the reflective members A and B has a plurality of cholesteric liquid crystal layers having different birefringence $\Delta n$, so that the side lobes occurred in the respective cholesteric liquid crystal layers interfere with each other and weaken each other, which leads to a reduction of the side lobes in each reflection band. As a result, it is presumed that the transmission characteristics of the bandpass filter have been improved.

The bandpass filter is not particularly limited as long as it includes the reflective member A and the reflective member B each having a plurality of cholesteric liquid crystal layers having different birefringence $\Delta n$.

In the following description, in a case where it is not necessary to distinguish between the reflective member A and the reflective member B, the reflective member A and the reflective member B are collectively referred to as "reflective member", unless otherwise specified. Similarly, in a case where it is not necessary to distinguish each cholesteric liquid crystal layer, it is also collectively referred to as "cholesteric liquid crystal layer", unless otherwise specified.

The reflection center wavelength of the reflective member can be appropriately adjusted according to the purpose of the bandpass filter, and may be located in any region of a visible light region, an ultraviolet light region, and an infrared light region. In a case where the reflection center wavelength of the reflective member is located in the visible light region, the reflection center wavelength may be located in any of a blue light region, a green light region, and a red light region.

In a case where the bandpass filter is used for a distance-measuring sensor, it is preferable that the reflection center wavelength of the reflective member is present in the infrared light region. More specifically, the reflection center wavelength $\lambda_A$ of the reflective member A and the reflection center wavelength $\lambda_B$ of the reflective member B are both preferably 600 nm or more and more preferably 700 nm or more. The upper limit value of the reflection center wavelength in this case is not particularly limited and may be, for example, 3,000 nm or less.

The reflection center wavelength of the reflective member can be controlled by adjusting the reflection center wavelength of each cholesteric liquid crystal layer of the reflective member by a method which will be described later.

The full width at half maximum of the reflection band exhibiting selective reflection is not particularly limited as long as the bandpass filter satisfies Expression (1) and is, for example, 30 to 500 nm and is preferably 50 to 500 nm, more preferably 100 to 500 nm from the viewpoint that light other than the light in the transmission region can be shielded.

The full width at half maximum of the reflection band can be controlled by adjusting the full width at half maximum of the selective reflection band of the cholesteric liquid crystalline phase in each cholesteric liquid crystal layer of the reflective member by a method which will be described later.

The reflection center wavelength, full width at half maximum, and half width at half maximum of the reflective member can be obtained from the reflection spectrum obtained by measuring the reflection spectrum of the reflective member using a UV-Vis-NIR spectrophotometer.

As shown in FIG. 2, the bandpass filter has a function of reflecting light having a wavelength included in the reflection band 200 by the reflective member A and light having a wavelength included in the reflection band 300 by the reflective member B, and transmitting light having a wavelength included in the transmission band 100 sandwiched between the reflection band 200 and the reflection band 300.

The transmission center wavelength $\lambda_T$ of the transmission band of the bandpass filter can be appropriately adjusted according to the purpose of the bandpass filter, and may be located in any region of a visible light region, an ultraviolet light region, and an infrared light region. In a case where the transmission center wavelength $\lambda_T$ of the transmission band is located in the visible light region, the reflection center wavelength may be located in any of a blue light region, a green light region, and a red light region.

In a case where the bandpass filter is used for a distance-measuring sensor, it is preferable that the transmission center wavelength $\lambda_T$ of the transmission band is present in the infrared light region. More specifically, the transmission center wavelength $\lambda_T$ of the transmission band is preferably included in a range of 700 to 3,000 nm and more preferably in a range of 800 to 2,000 Nm.

The full width at half maximum $F_T$ of the transmission band of the bandpass filter is not particularly limited, and is preferably 200 nm or less and more preferably 100 nm or less from the viewpoint that the effect of the present invention is more excellent. The lower limit of the full width at half maximum $F_T$ is not particularly limited, and is preferably 20 nm or more.

In addition, in the bandpass filter, the full width at half maximum $F_T$ of the transmission band is preferably 30.0% or less, more preferably 15.0% or less, and still more preferably 10.0% or less of the transmission center wavelength $\lambda_T$ of the transmission band, from the viewpoint that the effect of the present invention is more excellent. The lower limit value of the full width at half maximum $F_T$ is not particularly limited, and is, for example, 5% or more and preferably 1.5% or more.

In the present specification, the transmission center wavelength $\lambda_T$ of the transmission band of the bandpass filter is represented by Expression (3).

$$\lambda_T = \{(\lambda_A + H_A) + (\lambda_B - H_B)\}/2 \quad (3)$$

In addition, in the present specification, the full width at half maximum $F_T$ of the transmission band of the bandpass filter is expressed by Expression (4).

$$F_T = \{(\lambda_B - H_B) - (\lambda_A - H_A)\} \quad (4)$$

In Expression (3) and Expression (4), it is intended that the reflection center wavelength $\lambda_A$ of the reflective member A is shorter than the reflection center wavelength $\lambda_B$ of the reflective member B.

The transmission center wavelength $\lambda_T$ and the full width at half maximum $F_T$ of the transmission band can be controlled by adjusting the reflection center wavelength and the half width at half maximum of each reflective member by the above-mentioned method.

The bandpass filter may have, as the reflective members A and B, only a combination consisting of the laminate $A_R$ and the laminate $B_R$ that reflect dextrorotatory circularly polarized light; only a combination consisting of the laminate $A_L$ and the laminate $B_L$ that reflect levorotatory circularly polarized light; or both a combination consisting of the laminate $A_R$ and the laminate $B_R$ that reflect dextrorotatory circularly polarized light and a combination consisting of the laminate $A_L$ and the laminate $B_L$ that reflect levorotatory circularly polarized light.

The selective reflection characteristics of either dextrorotatory circularly polarized light or levorotatory circularly polarized light of the reflective member are due to a helical structure derived from the cholesteric liquid crystalline phase of the reflective member. That is, the selective reflection characteristics of the reflective member can be controlled by the helical structure of the cholesteric liquid crystalline phase formed on the cholesteric liquid crystal layer of the reflective member.

The selective reflection characteristics of the reflective member can be confirmed by incidence of dextrorotatory circularly polarized light and/or levorotatory circularly polarized light on the cholesteric liquid crystal layer.

The arrangement of each reflective member in the bandpass filter is not particularly limited. For example, the reflective member A and the reflective member B may be arranged in this order from the incident side of the light, or the reflective member B and the reflective member A may be arranged in this order from the incident side of the light.

In addition, in a case where a plurality of laminates are present as reflective members (for example, in a case where a laminate that reflects dextrorotatory circularly polarized light and a laminate that reflects levorotatory circularly polarized light are provided), these plurality of laminates may be arranged next to each other, or may be arranged through another layer.

The layer configuration in a case where the bandpass filter has the laminate $A_R$ and the laminate $A_L$ as the reflective member A, and has the laminate $B_R$ and the laminate $B_L$ as the reflective member B is illustrated below.

laminate $A_R$/laminate $B_R$/laminate $A_L$/laminate $B_L$
laminate $A_R$/laminate $A_L$/laminate $B_R$/laminate $B_L$
laminate $A_R$/laminate $A_L$/laminate $B_L$/laminate $B_R$
laminate $B_R$/laminate $A_R$/laminate $A_L$/laminate $B_L$ In addition to the reflective member A and the reflective member B, the bandpass filter may include a reflective member having a reflection center wavelength different from the reflection center wavelength $\lambda_A$ of the reflective member A and the reflection center wavelength $\lambda_B$ of the reflective member B, as long as the effect of the present invention is not impaired.

Reflective Member

The reflective member will be described in more detail.

The reflective member A is a member composed of a laminate having a first cholesteric liquid crystal layer and a second cholesteric liquid crystal layer, and is characterized in that the birefringence Δn1 of the first cholesteric liquid crystal layer is larger than the birefringence Δn2 of the second cholesteric liquid crystal layer.

In addition, the reflective member B is a member composed of a laminate having a third cholesteric liquid crystal layer and a fourth cholesteric liquid crystal layer, and is characterized in that the birefringence Δn3 of the third cholesteric liquid crystal layer is larger than the birefringence Δn4 of the fourth cholesteric liquid crystal layer.

The birefringence Δn1 of the first cholesteric liquid crystal layer and the birefringence Δn2 of the second cholesteric liquid crystal layer are not particularly limited as long as the birefringence Δn1 has a value larger than the birefringence Δn2.

Above all, the ratio of birefringence Δn2 to birefringence Δn1 (Δn2/Δn1) is preferably 0.95 or less, more preferably less than 0.9, and still more preferably less than 0.7, from the viewpoint that the effect of the present invention is more excellent. The upper limit of the ratio $\Delta n2/\Delta n1$ is preferably 0.2 or more, more preferably more than 0.3, still more preferably more than 0.4, and particularly preferably more than 0.5, from the viewpoint that the effect of the present invention is more excellent.

The birefringence $\Delta n1$ of the first cholesteric liquid crystal layer is not particularly limited, and is preferably 0.08 or more, more preferably 0.11 or more, and still more preferably 0.17 or more, from the viewpoint that the effect of the present invention is more excellent. The upper limit of the birefringence $\Delta n1$ is not particularly limited and may be 0.5 or less.

The birefringence $\Delta n3$ of the third cholesteric liquid crystal layer and the birefringence $\Delta n4$ of the fourth cholesteric liquid crystal layer are not particularly limited as long as the birefringence $\Delta n3$ has a value larger than the birefringence $\Delta n4$.

The preferred ranges of the birefringence $\Delta n3$ of the third cholesteric liquid crystal layer and the birefringence $\Delta n4$ of the fourth cholesteric liquid crystal layer are the same as the preferred ranges of the birefringence $\Delta n1$ of the first cholesteric liquid crystal layer and the birefringence $\Delta n2$ of the second cholesteric liquid crystal layer, respectively.

In the present specification, the birefringence (for example, $\Delta n1$ to $\Delta n4$ described above) of the object corresponds to a measured value at the transmission center wavelength $\lambda_T$ at 25° C.

The birefringence of each cholesteric liquid crystal layer can be measured by the method described in Examples which will be described later.

The difference between the reflection center wavelength $\lambda_1$ of the first cholesteric liquid crystal layer and the reflection center wavelength $\lambda_2$ of the second cholesteric liquid crystal layer is not particularly limited, and is, for example, less than 5.0% with respect to the reflection center wavelength $\lambda_1$. From the viewpoint that the effect of the present invention is more excellent, the difference between the reflection center wavelength $\lambda_1$ and the reflection center wavelength $\lambda_2$ is preferably less than 2.0% with respect to the reflection center wavelength $\lambda_1$, more preferably less than 1.0% with respect to the reflection center wavelength $\lambda_1$, and still more preferably less than 0.5% with respect to the reflection center wavelength $\lambda_1$. The lower limit is not particularly limited, and the difference between the reflection center wavelength $\lambda_1$ and the reflection center wavelength $\lambda_2$ may be 0.0% with respect to the reflection center wavelength $\lambda_1$.

The preferred range of the difference between the reflection center wavelength $\lambda_3$ of the third cholesteric liquid crystal layer and the reflection center wavelength $\lambda_4$ of the fourth cholesteric liquid crystal layer is also the same as the preferred range of the difference between the reflection center wavelength $\lambda_1$ and reflection center wavelength $\lambda_2$.

The control of the reflection center wavelength of each cholesteric liquid crystal layer will be described later.

The thickness $d1$ of the first cholesteric liquid crystal layer, the thickness $d2$ of the second cholesteric liquid crystal layer, the thickness $d3$ of the third cholesteric liquid crystal layer, and the thickness $d4$ of the fourth cholesteric liquid crystal layer are not particularly limited.

The thickness $d1$ of the first cholesteric liquid crystal layer and the thickness $d3$ of the third cholesteric liquid crystal layer are, for example, 0.5 to 4.0 times the transmission center wavelength $\lambda_T$ and preferably 1.0 to 3.0 times the transmission center wavelength $\lambda_T$.

The thickness $d2$ of the second cholesteric liquid crystal layer and the thickness $d4$ of the fourth cholesteric liquid crystal layer are, for example, 4.0 to 8.0 times the transmission center wavelength $\lambda_T$ and preferably 5.0 to 7.0 times the transmission center wavelength $\lambda_T$.

The ratio ($d2/d1$) of the thickness $d2$ of the second cholesteric liquid crystal layer to the thickness $d1$ of the first cholesteric liquid crystal layer is preferably 0.1 to 1.0, more preferably 0.2 to 0.8, and still more preferably 0.3 to 0.6 from the viewpoint that the effect of the present invention is more excellent. Above all, in a case where one second cholesteric liquid crystal layer is arranged on both surfaces of the first cholesteric liquid crystal layer, the ratio ($d2/d1$) is particularly preferably more than 0.3 and less than 0.5.

The preferred range of the ratio ($d4/d3$) of the thickness $d4$ of the fourth cholesteric liquid crystal layer to the thickness $d3$ of the third cholesteric liquid crystal layer is the same as that of the ratio ($d2/d1$).

The thickness of each cholesteric liquid crystal layer can be measured using an interference film thickness meter (for example, trade name "BW-A501", manufactured by Nikon Corporation).

The reflection center wavelength of the reflective member may be constant in an in-plane direction. Here, the fact that the reflection center wavelength of the reflective member is constant is intended to mean that the reflection center wavelength is substantially the same in any direction in the plane of the reflective member. By substantially the same, it is intended to mean that the difference between the maximum value and the minimum value of the reflection center wavelength is 5 nm or less.

In addition, the reflection center wavelength of the reflective member may be increased (shifted to a long wavelength side) as a distance from an in-plane central portion increases in at least one in-plane direction.

Figure 3:
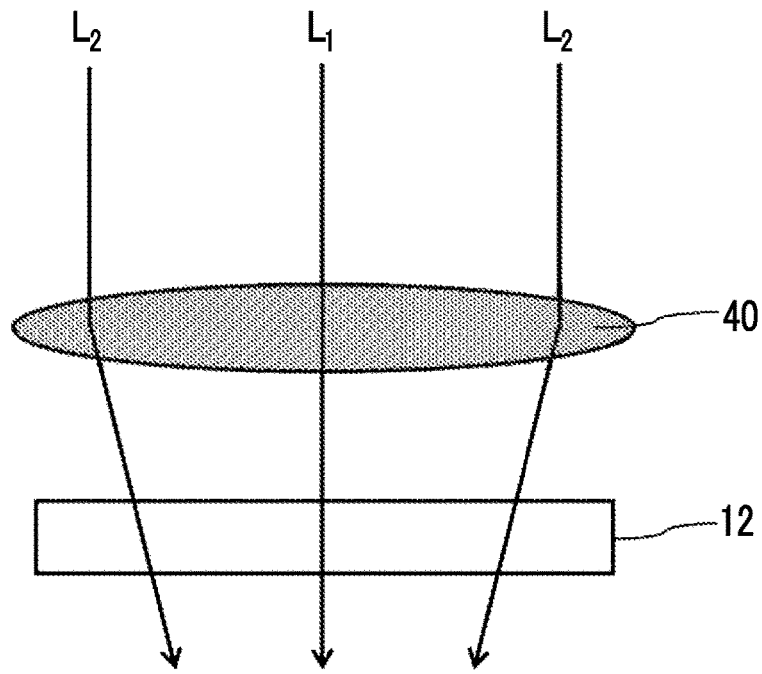
FIG. 3 is a conceptual diagram showing an example of a usage aspect of the bandpass filter according to the present invention.

FIG. 3 is a conceptual diagram showing an example of a usage aspect of the bandpass filter. In the aspect shown in FIG. 3, measurement lights $L_1$ and $L_2$ are incident on a bandpass filter 12 after passing through a lens 40. Here, the measurement light $L_1$ incident at a position close to the central portion of the lens 40 and the bandpass filter 12 is incident substantially perpendicular to the main surface of the bandpass filter 12, whereas the measurement light $L_2$ incident at a position of the peripheral portion spaced from the central portion of the lens 40 and the bandpass filter 12 is obliquely incident on the main surface of the bandpass filter 12.

At this time, in a case where a bandpass filter in which the reflection center wavelength of the reflective member is constant in the plane is used, a phenomenon called "blue shift", in which the reflection band of the reflective member shifts to a short wavelength side as the incident angle of light with respect to the main surface of the bandpass filter increases, occurs at a position such as a peripheral portion spaced from the central portion of the bandpass filter. As a result, the measurement light that should originally be transmitted is reflected by the reflective member having a reflection band on a long wavelength side, and the light such as external light that should be reflected by the reflective member having a reflection band on a short wavelength side is transmitted and reaches a light-receiving element (not shown). It is conceivable to shift or widen the transmission band of the bandpass filter as a response to the blue shift, but in that case, the SN ratio is lowered.

On the other hand, in the usage aspect shown in FIG. 3, by using the bandpass filter 12 provided with a reflective member whose reflection center wavelength increases as a distance from an in-plane central portion increases, that is, a reflective member whose reflection band shifts to a long wavelength side as a distance from an in-plane central portion increases, it is possible to maintain the wavelength selectivity as a bandpass filter, which transmits light of the wavelength emitted by the light source and reflects external light, even in a case where the light passing through the lens 40 is obliquely incident on the peripheral portion and a blue shift occurs. This eliminates the need to set a wide transmission band for the bandpass filter to accommodate a wide range of incident angles, resulting in a narrower transmission band, which makes it possible to improve the SN ratio and the light transmittance of the bandpass filter.

The reflective member whose reflection center wavelength increases as a distance from an in-plane central portion increases may be a reflective member whose reflection center wavelength gradually increases in a pattern as a distance from an in-plane central portion increases, or may be a reflective member having an in-plane gradient in which the reflection center wavelength continuously increases as a distance from an in-plane central portion increases. The direction in which the reflection center wavelength increases may be only one direction of in-plane directions, or may be a direction spreading radially from an in-plane central portion.

As the reflective member whose reflection center wavelength increases as a distance from an in-plane central portion increases, for example, as will be described later, as at least one cholesteric liquid crystal layer included in the reflective member, a cholesteric liquid crystal layer in which a cholesteric liquid crystalline phase is fixed may be used such that a helical pitch P spreads as a distance from an in-plane central portion increases.

Cholesteric Liquid Crystal Layer

The cholesteric liquid crystal layer is a layer formed by fixing a cholesteric liquid crystalline phase formed by helically cholesterically aligning a liquid crystal compound (liquid crystal material). That is, the cholesteric liquid crystal layer is a layer in which a liquid crystal compound is cholesterically aligned and fixed.

The cholesteric liquid crystal layer has a reflection center wavelength determined by the helical pitch of the cholesteric liquid crystalline phase, reflects light in a wavelength range including the reflection center wavelength, and transmits light in another wavelength range. That is, the reflection wavelength in the cholesteric liquid crystal layer depends on the helical pitch of the cholesteric liquid crystalline phase.

It is sufficient for the cholesteric liquid crystal layer that the optical properties of the cholesteric liquid crystalline phase are retained in the layer, and the liquid crystal compound in the layer may no longer exhibit liquid crystallinity. For example, the polymerizable liquid crystal compound may have a high molecular weight due to a curing reaction and therefore may no longer have liquid crystallinity.

Cholesteric Liquid Crystalline Phase

The cholesteric liquid crystalline phase exhibits specific selective reflection derived from a helical structure.

In the cholesteric liquid crystalline phase, the center wavelength of selective reflection (reflection center wavelength) 2 depends on the helical pitch P (=helical period) in the cholesteric liquid crystalline phase, which draws the relationship of $\lambda = n \times P$ between the average refractive index n of the cholesteric liquid crystalline phase and $\lambda$. Therefore, the reflection center wavelength can be adjusted by adjusting the helical pitch P.

The longer the helical pitch P, the longer the reflection center wavelength of the cholesteric liquid crystalline phase. As described above, the helical pitch P is one pitch of the helical structure (helical period) of the cholesteric liquid crystalline phase, in other words, one helical turn in terms of the number of helical turns, that is, the length in a helical axis direction in which the director of the liquid crystal compound constituting the cholesteric liquid crystalline phase (in a major axis direction in a case of a rod-like liquid crystal) rotates 360°.

In a case where the cross section of the cholesteric liquid crystal layer is observed with a scanning electron microscope (SEM), a stripe pattern having alternating bright lines (bright portions) and dark lines (dark portions) in a thickness direction is observed due to the cholesteric liquid crystalline phase. The helical pitch P is equal to a length of two bright lines and three dark lines in a thickness direction, that is, a length of three dark lines and two bright lines in a thickness direction.

The helical pitch P of the cholesteric liquid crystalline phase depends on the type of the chiral agent used together with the liquid crystal compound and the concentration of the chiral agent added in a case of forming the cholesteric liquid crystal layer. Therefore, a desired helical pitch can be obtained by adjusting these factors.

The adjustment of the helical pitch P is described in detail in Fujifilm Research Report No. 50 (2005), pp. 60 to 63. As a method for measuring helical sense and pitch, the methods described in "Easy Steps in Liquid Crystal Chemistry Experiment" p 46, edited by The Japanese Liquid Crystal Society, Sigma Publishing Company, published in 2007, and "Liquid Crystal Handbook" p 196, Editorial Committee of Liquid Crystal Handbook, Maruzen Co., Ltd. can be used.

The cholesteric liquid crystalline phase exhibits selective reflectivity to either levorotatory or dextrorotatory circularly polarized light at a specific wavelength. Whether the reflected light is dextrorotatory circularly polarized light or levorotatory circularly polarized light depends on the twisted direction (sense) of the helix of the cholesteric liquid crystalline phase. The selective reflection of circularly polarized light by the cholesteric liquid crystalline phase reflects the dextrorotatory circularly polarized light in a case where the twisted direction of the helix of the cholesteric liquid crystal layer is right-handed, and reflects the levorotatory circularly polarized light in a case where the twisted direction of the helix is left-handed. Therefore, the twisted direction of the helix in the cholesteric liquid crystalline phase can be confirmed by incidence of dextrorotatory circularly polarized light and/or levorotatory circularly polarized light on the cholesteric liquid crystal layer.

The turning direction of the cholesteric liquid crystalline phase can be adjusted by the type of the liquid crystal compound forming the cholesteric liquid crystal layer and/or the type of the chiral agent added.

In addition, the half-width (nm) of the reflection band (circularly polarized light reflection wavelength range) exhibiting selective reflection depends on the birefringence $\Delta n$ of the cholesteric liquid crystalline phase and the helical pitch P, which draws the relationship of $\Delta \lambda = \Delta n \times P$. Therefore, the wavelength width of the reflection wavelength band can be controlled by adjusting $\Delta n$. The $\Delta n$ can be adjusted by the type of the liquid crystal compound forming the cholesteric liquid crystal layer, the mixing ratio thereof, and the temperature at the time of fixing the alignment.

The half-width may be adjusted according to the application of the bandpass filter. The half-width of the primary light may be, for example, 30 nm or more.

In the cholesteric liquid crystal layer, the reflection center wavelength is not limited and may be appropriately set according to the application of a sensor using a bandpass filter.

Specifically, in the cholesteric liquid crystal layer, the reflection center wavelength may be appropriately set according to the wavelength of the measurement light used by the sensor. For example, in a case where the bandpass filter is used for a distance-measuring sensor, it is preferable that the reflection center wavelength of the cholesteric liquid crystal layer is present in the infrared light region. More specifically, the reflection center wavelength of the cholesteric liquid crystal layer is preferably 600 nm or more and more preferably 700 nm or more. The upper limit value of the reflection center wavelength in this case is not particularly limited and may be 3,000 nm or less.

As described above, the reflection center wavelength of the cholesteric liquid crystal layer depends on the helical pitch P. The helical pitch P can be calculated in such a manner that a reflection spectrum of the cholesteric liquid crystal layer is measured using a UV-Vis-NIR spectrophotometer, a reflection center wavelength is obtained from the obtained reflection spectrum, and the helical pitch is calculated from the obtained reflection center wavelength and the average refractive index n of the cholesteric liquid crystal layer. In addition, the helical pitch P may be measured by the methods described in "Easy Steps in Liquid Crystal Chemistry Experiment", p 46, edited by The Japanese Liquid Crystal Society, Sigma Publishing Company, published in 2007, and "Liquid Crystal Handbook", p 196, Editorial Committee of Liquid Crystal Handbook, Maruzen Co., Ltd.

The helical pitch P of the cholesteric liquid crystal layer may be constant in an in-plane direction. Here, the fact that the helical pitch P is constant is intended to mean that the helical pitch P is substantially the same in any direction in the plane of the cholesteric liquid crystal layer. By substantially the same, it is intended to mean that the absolute value of the difference between the helical pitches P is 30 nm or less.

The helical pitch P of the cholesteric liquid crystal layer may spread in at least one in-plane direction in the plane as a distance from an in-plane central portion increases. By using the cholesteric liquid crystal layer having such a cholesteric liquid crystalline phase, it is possible to form the above-mentioned reflective member whose reflection center wavelength increases as a distance from an in-plane central portion increases in at least one in-plane direction.

According to the reflection characteristics of a target reflective member, the cholesteric liquid crystal layer whose helical pitch P spreads as a distance from an in-plane central portion increases may be configured such that the helical pitch P gradually spreads in a pattern as a distance from an in-plane central portion increases, or may have a gradient in which the helical pitch P continuously spreads as a distance from an in-plane central portion increases. In addition, the direction in which the helical pitch P spreads may be only one direction of in-plane directions, or may be a direction spreading radially from an in-plane central portion.

Method for Forming Cholesteric Liquid Crystal Layer

The cholesteric liquid crystal layer can be formed by fixing a cholesteric liquid crystalline phase in a layered manner.

The structure in which the cholesteric liquid crystalline phase is fixed may be any structure as long as the alignment of the liquid crystal compound which is the cholesteric liquid crystalline phase is maintained. Typically, it is preferably a structure in which a polymerizable liquid crystal compound is brought into an alignment state of a cholesteric liquid crystalline phase, and then polymerized and cured by irradiation with ultraviolet rays, heating, or the like to form a non-fluid layer, and at the same time, the polymerized and cured liquid crystal compound is changed into a state in which the alignment morphology is not changed by an external field or an external force.

In the structure in which the cholesteric liquid crystalline phase is fixed, it is sufficient that the optical properties of the cholesteric liquid crystalline phase are maintained, and the liquid crystal compound does not have to exhibit liquid crystallinity in the cholesteric liquid crystal layer. For example, the polymerizable liquid crystal compound may have a high molecular weight due to a curing reaction and lose its liquid crystallinity.

A liquid crystal composition containing a liquid crystal compound can be mentioned as an example of the material used for forming the cholesteric liquid crystal layer in which the cholesteric liquid crystalline phase is fixed. The liquid crystal compound is preferably a polymerizable liquid crystal compound.

In addition, the liquid crystal composition used for forming the cholesteric liquid crystal layer may further contain a surfactant and a chiral agent.

Polymerizable Liquid Crystal Compound (Rod-Like Liquid Crystal Compound)

The polymerizable liquid crystal compound may be a rod-like liquid crystal compound or a disk-like liquid crystal compound.

Examples of the rod-like polymerizable liquid crystal compound forming the cholesteric liquid crystalline phase include a rod-like nematic liquid crystal compound. Azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles are preferably used as the rod-like nematic liquid crystal compound. Not only a low molecular weight liquid crystal compound but also a polymer liquid crystal compound can be used.

The polymerizable liquid crystal compound is obtained by introducing a polymerizable group into a liquid crystal compound. Examples of the polymerizable group include an unsaturated polymerizable group, an epoxy group, and an aziridinyl group, among which an unsaturated polymerizable group is preferable and an ethylenically unsaturated polymerizable group is more preferable. The polymerizable group can be introduced into the molecule of the liquid crystal compound by various methods. The number of polymerizable groups contained in the polymerizable liquid crystal compound is preferably 1 to 6, and more preferably 1 to 3.

Examples of the polymerizable liquid crystal compound include the compounds described in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-1101-272551A), JP1994-016616A (JP-H06-016616A), JP1995-110469A (JP-H07-110469A), JP1999-080081AA (JP-H11-080081A), JP2001-328973A, and the like. Two or more polymerizable liquid crystal compounds may be used in combination. In a case where two or more polymerizable liquid crystal compounds are used in combination, the alignment temperature can be lowered.

In addition, a cyclic organopolysiloxane compound having a cholesteric phase as disclosed in JP1982-165480A (JP-S57-165480A) can be used as the polymerizable liquid crystal compound other than the above-mentioned compounds. Further, a polymer having a mesogen group exhibiting a liquid crystallinity introduced into a main chain, a side chain, or both the main chain and the side chain, a polymer cholesteric liquid crystal having a cholesteryl group introduced into a side chain, a liquid crystalline polymer as disclosed in JP1997-133810A (JP-H09-133810A), a liquid crystalline polymer as disclosed in JP1999-293252A (JP-H11-293252A), and the like can be used as the above-mentioned polymer liquid crystal compound.

From the viewpoint of excellent thermal expansion coefficient, it is preferable to use a polymerizable liquid crystal compound having one polymerizable group and a polymerizable liquid crystal compound having two polymerizable groups in combination. For example, liquid crystal compounds as disclosed in JP2018-01283 OA, JP1996-092556A (JP-H08-092556A), and JP1998-087565A (JP-H10-087565A) can be used as the polymerizable liquid crystal compound having one polymerizable group.

The percentage of the polymerizable liquid crystal compound having one polymerizable group in the liquid crystal composition is preferably 5% by mass or more and more preferably 10% by mass or more from the viewpoint of excellent thermal expansion coefficient. On the other hand, in a case where the number of polymerizable liquid crystal compounds having one polymerizable group is too large, the cured cholesteric liquid crystal layer tends to swell due to a solvent or the like, and it becomes difficult to obtain a desired optical configuration. Therefore, the percentage of the polymerizable liquid crystal compound having one polymerizable group is preferably less than 70% by mass and more preferably less than 40% by mass from the viewpoint of excellent swelling resistance.

From the viewpoint of excellent thermal expansion coefficient, it is preferable to use a polymerizable liquid crystal compound having a linear or branched chain alkyl, alkoxy, or alkenyl having three or more carbon atoms as a substituent. One or more CH2 groups may be each independently substituted by —O—, —S—, —CO—, —COO—, —OCO—, —OCOO—, or —C≡C— such that oxygen atoms do not directly bond with each other. The number of carbon atoms is preferably 6 to 18 and more preferably 8 to 12 from the viewpoint of achieving both liquid crystallinity and thermal expansion coefficient. The substituent may be directly substituted for the aromatic ring in the polymerizable liquid crystal compound, or may be substituted through a divalent linking group such as an ether group, a thioether group, an amino group, an amide group, a carbonyl group, or an ester group.

The percentage of the polymerizable liquid crystal compound having the substituent in the liquid crystal composition is preferably 5% by mass or more and more preferably 10% by mass or more from the viewpoint of excellent thermal expansion coefficient. There is no particular upper limit, and it is, for example, less than 70% by mass.

From the viewpoint of excellent thermal expansion coefficient, it is preferable to use a polymerizable liquid crystal compound having a linear or branched chain alkylene or alkenylene group having 6 or more carbon atoms as the linking group. One or more CH2 groups may be each independently substituted by —O—, —S—, —CO—, —COO—, —OCO—, —OCOO—, or such that oxygen atoms do not directly bond with each other. The number of carbon atoms is preferably 6 to 18 and more preferably 8 to 12 from the viewpoint of achieving both liquid crystallinity and thermal expansion coefficient.

The percentage of the polymerizable liquid crystal compound having the substituent in the liquid crystal composition is preferably 5% by mass or more and more preferably 10% by mass or more from the viewpoint of excellent thermal expansion coefficient. There is no particular upper limit, and it is, for example, less than 70% by mass.

Disk-Like Liquid Crystal Compound

For example, the disk-like liquid crystal compounds described in JP2007-108732A, JP2010-244038A, and the like can be preferably used as the disk-like liquid crystal compound.

In addition, the amount of the polymerizable liquid crystal compound added to the liquid crystal composition is preferably 75% to 99.9% by mass, more preferably 80% to 99%, and still more preferably 85% to 90% by mass with respect to the solid content mass (mass excluding a solvent) of the liquid crystal composition.

Surfactant

The liquid crystal composition used for forming the cholesteric liquid crystal layer may contain a surfactant.

The surfactant is preferably a compound capable of functioning as an alignment control agent that contributes to the alignment of the cholesteric liquid crystalline phase stably or rapidly. Examples of the surfactant include a silicone-based surfactant and a fluorine-based surfactant, among which a fluorine-based surfactant is preferably exemplified.

Specific examples of the surfactant include the compounds described in paragraphs [0082] to [0090] of JP2014-119605A, the compounds described in paragraphs [0031] to [0034] of JP2012-203237A, the compounds exemplified in paragraphs [0092] and [0093] of JP2005-099248A, the compounds exemplified in paragraphs [0076] to [0078] and paragraphs [0082] to [0085] of JP2002-129162A, the compounds exemplified in the above, and the fluorinated (meth) acrylate-based polymers described in paragraphs [0018] to [0043] of JP2007-272185A.

The surfactants may be used alone or in combination of two or more thereof.

The compounds described in paragraphs [0082] to [0090] of JP2014-119605A are preferable as the fluorine-based surfactant.

The amount of the surfactant added to the liquid crystal composition is preferably 0.01% to 10% by mass, more preferably 0.01% to 5% by mass, and still more preferably 0.02% to 1% by mass with respect to the total mass of the liquid crystal compound.

Chiral Agent (Optically Active Compound)

The chiral agent has a function of inducing a helical structure of a cholesteric liquid crystalline phase. The chiral agent may be selected according to the purpose, since the twisted direction or helical period pitch of the helix induced by the compound is different.

The chiral agent is not particularly limited, and known compounds (for example, Liquid Crystal Device Handbook, Chapter 3, Section 4-3, chiral agents for TN (twisted nematic), STN (Super Twisted Nematic), p. 199, edited by the 142nd Committee of the Japan Society for the Promotion of Science, 1989), isosorbide, isomannide derivatives, and the like can be used.

The chiral agent generally contains an asymmetric carbon atom, but an axially asymmetric compound or a planarly asymmetric compound that does not contain an asymmetric carbon atom can also be used as the chiral agent. Examples of the axially asymmetric compound or the planarly asymmetric compound include binaphthyl, helicene, paracyclophane, and derivatives thereof. The chiral agent may have a polymerizable group. In a case where both the chiral agent and the liquid crystal compound have a polymerizable group, a polymer having a repeating unit derived from the polymerizable liquid crystal compound and a repeating unit derived from the chiral agent can be formed by the polymerization reaction of the polymerizable chiral agent with the polymerizable liquid crystal compound. In this aspect, the polymerizable group of the polymerizable chiral agent is preferably a group of the same type as the polymerizable group of the polymerizable liquid crystal compound. Therefore, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent has a photoisomerizing group, it is preferable because a pattern of a desired reflection wavelength corresponding to the luminescence wavelength can be formed by photo mask irradiation of an active ray or the like after coating and alignment. The photoisomerizing group is preferably an isomerization site of a compound exhibiting photochromic properties, an azo group, an azoxy group, or a cinnamoyl group. Specific compounds of the chiral agent that can be used include the compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, JP2003-313292A, and the like.

The content of the chiral agent in the liquid crystal composition is preferably 0.01 to 200 mol % and more preferably 1 to 30 mol % with respect to the molar content of the liquid crystal compound.

Polymerization Initiator

In a case where the liquid crystal composition contains a polymerizable compound, the composition preferably contains a polymerization initiator. In the aspect in which the polymerization reaction is allowed to proceed by irradiation with ultraviolet rays, the polymerization initiator used is preferably a photopolymerization initiator capable of initiating the polymerization reaction upon irradiation with ultraviolet rays.

Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the photopolymerization initiator in the liquid crystal composition is preferably 0.1% to 20% by mass and more preferably 0.5% to 12% by mass with respect to the content of the liquid crystal compound.

Crosslinking Agent

The liquid crystal composition may optionally contain a crosslinking agent in order to improve the film hardness and durability after curing. Those that are cured by ultraviolet rays, heat, moisture, and the like can be suitably used as the crosslinking agent.

The crosslinking agent is not particularly limited and may be appropriately selected depending on the intended purpose. Examples of the crosslinking agent include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl)-3-aminopropyltrimethoxysilane. In addition, a known catalyst can be used depending on the reactivity of the crosslinking agent, and therefore the productivity can be improved in addition to the improvement of the film hardness and the durability. These crosslinking agent compounds may be used alone or in combination of two or more thereof.

The content of the crosslinking agent is preferably 3% to 20% by mass and more preferably 5% to 15% by mass with respect to the solid content mass of the liquid crystal composition. In a case where the content of the crosslinking agent is within the above range, the effect of improving the crosslinking density can be easily obtained, and the stability of the cholesteric liquid crystalline phase is further improved.

Other Additives

If necessary, a polymerization inhibitor, an antioxidant, an ultraviolet absorber, a light stabilizer, a coloring material, a metal oxide fine particle, or the like can be further added to the liquid crystal composition within a range that does not deteriorate the optical performance and the like.

The liquid crystal composition is preferably used as a liquid in a case of forming a cholesteric liquid crystal layer.

The liquid crystal composition may contain a solvent. The solvent is not limited and may be appropriately selected depending on the intended purpose. The solvent is preferably an organic solvent.

The organic solvent is not limited and may be appropriately selected depending on the intended purpose. Examples of the organic solvent include ketones, alkyl halides, amides, sulfoxides, heterocyclic compounds, hydrocarbons, esters, and ethers. These crosslinking agent compounds may be used alone or in combination of two or more thereof. Among these solvent compounds, ketones are preferable in consideration of the burden on the environment.

In a case of forming a cholesteric liquid crystal layer, it is preferable to carry out such a way that a liquid crystal composition is applied onto a forming surface of the cholesteric liquid crystal layer to align a liquid crystal compound in the state of a cholesteric liquid crystalline phase, and then the liquid crystal compound is cured to form a cholesteric liquid crystal layer.

For example, in a case where a cholesteric liquid crystal layer is formed on an alignment film, it is preferable to form the cholesteric liquid crystal layer in which a liquid crystal composition is applied onto the alignment film to align a liquid crystal compound in the state of a cholesteric liquid crystalline phase, and then the liquid crystal compound is cured to fix the cholesteric liquid crystalline phase.

For the application of the liquid crystal composition, printing methods such as ink jetting and scroll printing, and known methods such as spin coating, bar coating, and spray coating that can uniformly apply a liquid to a sheet-like material can be used.

The applied liquid crystal composition is dried and/or heated as needed and then cured to form a cholesteric liquid crystal layer. In this drying and/or heating step, the liquid crystal compound in the liquid crystal composition may be aligned into a cholesteric liquid crystalline phase. In a case of carrying out heating, the heating temperature is preferably 200° C. or lower and more preferably 130° C. or lower.

The aligned liquid crystal compound is further polymerized, if necessary. The polymerization may be either thermal polymerization or photopolymerization by light irradiation, but photopolymerization is preferable. It is preferable to use ultraviolet rays for light irradiation. The irradiation energy is preferably 20 mJ/cm$^2$ to 50 J/cm$^2$ and more preferably 50 to 1,500 mJ/cm$^2$. The light irradiation may be carried out under heating conditions or a nitrogen atmosphere in order to promote the photopolymerization reaction. The wavelength of the ultraviolet rays for irradiation is preferably 250 to 430 nm.

The preferred range of the thickness of the cholesteric liquid crystal layer is as described above. With regard to the thickness of the cholesteric liquid crystal layer, a thickness at which the required reflectivity of light can be obtained may be appropriately set according to the application of the bandpass filter, the reflectivity of light required for the cholesteric liquid crystal layer, the material for forming the cholesteric liquid crystal layer, and the like.

Action of Cholesteric Liquid Crystal Layer

Next, the action of the cholesteric liquid crystal layer having the above-mentioned configuration will be described.

In a case where light of a reflection wavelength is incident on the cholesteric liquid crystal layer, the cholesteric liquid crystalline phase reflects circularly polarized light of either dextrorotatory circularly polarized light or levorotatory circularly polarized light depending on the turning direction of the cholesteric liquid crystalline phase. As a result, light in the wavelength range around the reflection center wavelength is reflected almost uniformly with high reflectivity.

The thermal expansion coefficient of the cholesteric liquid crystal layer is preferably 20 ppm/° C. or more, more preferably 50 ppm/° C. or more, and still more preferably 100 ppm/° C. or more.

Meanwhile, it is known that an output wavelength of a laser shifts to a long wavelength side as an environmental temperature rises. Conventionally, in a case where a bandpass filter is used in combination with a laser, it has been necessary to design a wide transmission band of the bandpass filter in order to cope with fluctuations in the output wavelength of the laser. On the other hand, in a case where the thermal expansion coefficient of the cholesteric liquid crystal layer is in the above range, the cholesteric liquid crystal layer expands as the environmental temperature rises. In a case where the cholesteric liquid crystal layer expands and extends in a thickness direction, the helical structure of the cholesteric liquid crystalline phase extends in a thickness direction and the reflection band of the cholesteric liquid crystal layer shifts to a long wavelength side. Therefore, even in a case where the environmental temperature rises, the transmission band of the bandpass filter can be shifted to a long wavelength side to follow the fluctuation of the luminescence wavelength of a light source such as a laser. Therefore, by using a cholesteric liquid crystal layer having a thermal expansion coefficient in the above range, it is possible to suppress a decrease in the amount of light received by a light-receiving element due to fluctuations in the luminescence wavelength of a light source due to an environmental temperature, and therefore it is possible to further improve the SN ratio by using a bandpass filter having a narrower transmission band.

The upper limit value of the thermal expansion coefficient of the cholesteric liquid crystal layer is not particularly limited, and is preferably 600 ppm/° C. or less and more preferably 500 ppm/° C. or less.

The thermal expansion coefficient can be measured by a known method such as JIS K 7197, and is obtained by, for example, thermomechanical property measurement using a thermomechanical analyzer (TMA 4000 SE, manufactured by NETZSCH Company). The measurement conditions are, for example, a sample size of 5 mm×20 mm, a chuck-to-chuck distance of 15 mm, and a chuck part length of 2.5±0.5 mm both above and below, and the temperature is changed at 5° C./min in a range of −20° C. to 60° C. and a displacement amount of the chuck-to-chuck distance at that time is measured. In addition, a load is measured by applying a constant weight of 3 g to the sample. Subsequently, a slope of an approximate straight line of the displacement amount data at −20° C. to 60° C. is obtained, and a displacement amount per 1° C. change in temperature is obtained. Further, the thermal expansion coefficient can be calculated by dividing the slope by the chuck-to-chuck distance of 15 mm at the time of sample setting.

Other Aspects of Reflective Member

In the bandpass filter shown in FIG. 1, the second cholesteric liquid crystal layer 32 is arranged on both surfaces of the first cholesteric liquid crystal layer 31, but the layer configuration of the reflective member is not limited to the form shown in FIG. 1.

For example, the second cholesteric liquid crystal layer may be arranged only on one surface of the first cholesteric liquid crystal layer. It is preferable that the second cholesteric liquid crystal layer is arranged on each of both surfaces of the first cholesteric liquid crystal layer from the viewpoint that the effect of the present invention is more excellent.

In addition, a plurality of second cholesteric liquid crystal layers may be arranged on one surface or both surfaces of the first cholesteric liquid crystal layer.

In addition, the reflective member A may have a fifth cholesteric liquid crystal layer different from the first cholesteric liquid crystal layer and the second cholesteric liquid crystal layer, and the reflective member B may have a sixth cholesteric liquid crystal layer different from the third cholesteric liquid crystal layer and the fourth cholesteric liquid crystal layer.

Figure 4:
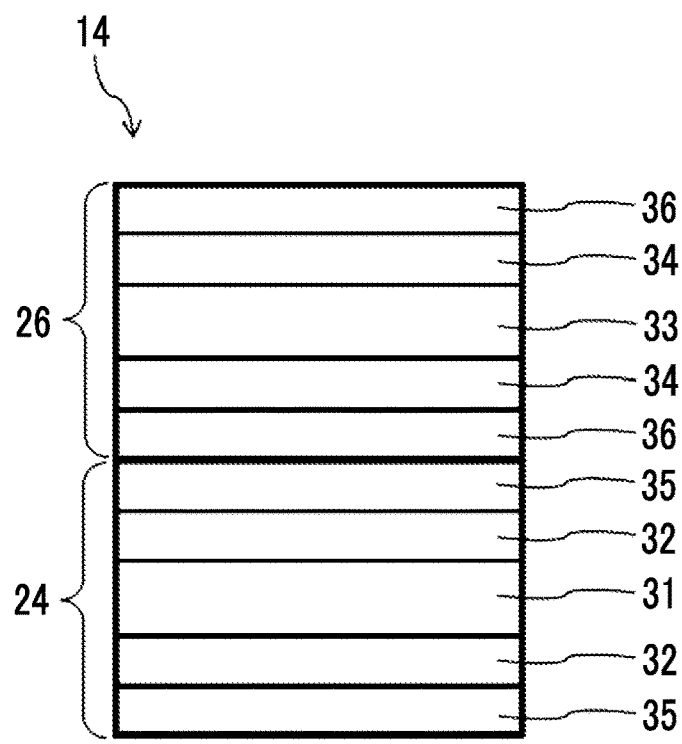
FIG. 4 is a conceptual diagram showing another example of the configuration of the bandpass filter according to the present invention.

FIG. 4 is a conceptual diagram showing another configuration example of the bandpass filter according to the embodiment of the present invention, and shows the configuration of each layer in the cross section of the bandpass filter in a thickness direction (lamination direction).

A bandpass filter 14 shown in FIG. 4 has a reflective member A24 and a reflective member B26, in which the reflective member A24 is a laminate formed by laminating the fifth cholesteric liquid crystal layer 35, the second cholesteric liquid crystal layer 32, the first cholesteric liquid crystal layer 31, the second cholesteric liquid crystal layer 32, and the fifth cholesteric liquid crystal layer 35 in this order, and the reflective member B26 is a laminate formed by laminating the sixth cholesteric liquid crystal layer 36, the fourth cholesteric liquid crystal layer 34, the third cholesteric liquid crystal layer 33, the fourth cholesteric liquid crystal layer 34, and the sixth cholesteric liquid crystal layer 36 in this order.

Further, the birefringence Δn5 of the fifth cholesteric liquid crystal layer 35 is smaller than the birefringence Δn2 of the second cholesteric liquid crystal layer 32, and the birefringence Δn6 of the sixth cholesteric liquid crystal layer 36 is smaller than the birefringence Δn4 of the fourth cholesteric liquid crystal layer 34.

By providing the fifth cholesteric liquid crystal layer having a birefringence Δn smaller than that of the second cholesteric liquid crystal layer on the surface side of the laminate constituting the reflective member A, and providing the sixth cholesteric liquid crystal layer having a birefringence Δn smaller than that of the fourth cholesteric liquid crystal layer on the surface side of the laminate constituting the reflective member B, the side lobes of each reflection band are further reduced, which makes it possible to obtain a bandpass filter in which the effect of the present invention is more excellent.

The aspect in which the reflective member A has the fifth cholesteric liquid crystal layer and the aspect in which the reflective member B has the sixth cholesteric liquid crystal layer are not limited to those aspects shown in FIG. 4.

For example, the fifth cholesteric liquid crystal layer may be arranged only on one of the main surfaces of the laminate constituting the reflective member A, and the sixth cholesteric liquid crystal layer may be arranged on only one of the main surfaces of the laminate constituting the reflective member B.

From the viewpoint that the effect of the present invention is more excellent, it is preferable that the fifth cholesteric liquid crystal layer is arranged on each of both surface sides of the laminate constituting the reflective member A, and it is preferable that the sixth cholesteric liquid crystal layer is arranged on each of both surface sides of the laminate constituting the reflective member B.

That is, from the viewpoint that the effect of the present invention is more excellent, the reflective member A is more preferably a laminate having the fifth cholesteric liquid crystal layer, the second cholesteric liquid crystal layer, the first cholesteric liquid crystal layer, the second cholesteric liquid crystal layer, and the fifth cholesteric liquid crystal layer in this order. Similarly, from the viewpoint that the effect of the present invention is more excellent, the reflective member B is more preferably a laminate having the sixth cholesteric liquid crystal layer, the fourth cholesteric liquid crystal layer, the third cholesteric liquid crystal layer, the fourth cholesteric liquid crystal layer, and the sixth cholesteric liquid crystal layer in this order.

The ratio of birefringence Δn5 to birefringence Δn2 (Δn5/Δn2) in a case where the reflective member A has the fifth cholesteric liquid crystal layer, and the ratio of birefringence Δn6 to birefringence Δn4 (Δn6/Δn4) in a case where the reflective member B has the sixth cholesteric liquid crystal layer are each preferably 0.2 to 0.6 and more preferably 0.3 to 0.5, from the viewpoint that the effect of the present invention is more excellent.

Aspects other than the birefringence Δn of the fifth cholesteric liquid crystal layer of the reflective member A and the sixth cholesteric liquid crystal layer of the reflective member B are the same as those of the above-mentioned cholesteric liquid crystal layer, including preferred aspects.

The bandpass filter may have a layer other than the above-mentioned reflective members. Examples of the layer other than the reflective members include a support and an alignment film.

Support

The support is a member that supports the reflective member. Various sheet-like materials (a film and a plate-like material) can be used as the support as long as those materials can support the reflective member.

It is preferable to use a support having a sufficient light transmittance in the transmission band of the bandpass filter.

The thickness of the support is not limited as long as it can support the reflective member, and may be appropriately set according to the application of the bandpass filter, the material for forming the support, and the like.

The thickness of the support is preferably 1 to 2,000 μm, more preferably 3 to 500 μm, and still more preferably 5 to 250 μm.

The Support May be Single-Layered or Multi-Layered.

The support in a case of being single-layered may be, for example, a support consisting of a material such as glass, triacetyl cellulose (TAC), polyethylene terephthalate (PET), polycarbonate, polyvinyl chloride, acrylic, or polyolefin. The support in a case of being multi-layered may be, for example, one including any of the above-mentioned single-layered supports as a substrate and another layer provided on the surface of the substrate.

From the viewpoint that the expansion and contraction in a thickness direction of the cholesteric liquid crystal layer arranged on the surface of the support can be further promoted in a case where the environmental temperature changes, the thermal expansion coefficient of the support is preferably lower than the thermal expansion coefficient of the cholesteric liquid crystal layer, and more preferably 20 ppm/° C. or more lower than the thermal expansion coefficient of the cholesteric liquid crystal layer.

After forming the cholesteric liquid crystal layer on the surface of the support, the support may be peeled off and the thus-formed cholesteric liquid crystal layer may be transferred to a member such as another support. That is, the support may be a temporary support.

In a case where the support is a temporary support, various temporary supports used in producing the cholesteric liquid crystal layer are exemplified. Examples of the temporary support include film-like members consisting of members such as glass, triacetyl cellulose (TAC), polyethylene terephthalate (PET), polycarbonate, polyvinyl chloride, acrylic, and polyolefin. In addition, the support may be a multi-layered support having a plurality of layers consisting of these materials.

Alignment Film

The alignment film is formed on the surface (upper surface) of the support.

The alignment film is an alignment film for aligning a liquid crystal compound in a predetermined alignment state in a case of forming a cholesteric liquid crystal layer.

Various known alignment films can be used as the alignment film.

Examples of the alignment film include a rubbing-treated film consisting of an organic compound such as a polymer, an oblique vapor-deposited film of an inorganic compound, a film having microgrooves, a film in which a Langmuir-Blodgett (LB) film obtained by the Langmuir-Blodgett method of an organic compound such as ω-tricosanoic acid, dioctadecylmethylammonium chloride, or methyl stearate is accumulated, and a photo-alignment film obtained by irradiating a photo-alignable material with polarized light or non-polarized light to form an alignment film.

The alignment film may be formed by a known method according to the material for forming the alignment film.

For example, the rubbing-treated alignment film can be formed by rubbing the surface of the polymer layer with paper or cloth several times in a certain direction.

Preferred examples of the material used for the alignment film include polyimides, polyvinyl alcohols, the polymers having a polymerizable group described in JP1997-152509A (JP-H09-152509A), and the materials used for forming the alignment film or the like described in JP2005-097377A, JP2005-099228A, and JP2005-128503A.

In addition, the support may act as the alignment film by subjecting the support to a treatment such as rubbing treatment or laser processing without forming the alignment film.

A so-called photo-alignment film, which is obtained by irradiating a photo-alignable material with polarized light or non-polarized light to form an alignment film, is also suitably used as the alignment film. That is, a photo-alignment film formed by applying a photo-alignment material onto a support is suitably used as the alignment film.

The polarized light irradiation can be carried out from a vertical direction or an oblique direction with respect to the photo-alignment film, and the non-polarized light irradiation can be carried out from an oblique direction with respect to the photo-alignment film.

Examples of the photo-alignment material used for the alignment film include the azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; aromatic ester compounds described in JP2002-229039A; maleimide and/or alkenyl-substituted nadiimide compounds having a photo-alignment unit described in JP2002-265541A and JP2002-317013A; photo-crosslinkable silane derivatives described in JP4205195B and JP4205198B; photo-crosslinkable polyimides, photo-crosslinkable polyamides, and photo-crosslinkable polyesters described in JP2003-520878A, JP2004-529220A, and JP4162850B; and photo-dimerizable compounds described in JP1997-118717A (JP-H09-118717A), JP1998-506420A (JP-H10-506420A), JP2003-505561A, WO2010/150748A, JP2013-177561A, and JP2014-012823A, and in particular, cinnamate compounds, chalcone compounds, and coumarin compounds are exemplified as preferred examples.

Among those compounds, azo compounds, photocrosslinkable polyimides, photocrosslinkable polyamides, photocrosslinkable polyesters, cinnamate compounds, and chalcone compounds are suitably used.

The thickness of the alignment film is not limited, and the thickness at which the required alignment function can be obtained may be appropriately set according to the material for forming the alignment film.

The thickness of the alignment film is preferably 0.01 to 5 µm and more preferably 0.05 to 2 µm.

Sensor

The sensor according to the embodiment of the present invention includes a light source, a bandpass filter that transmits light having an emission peak wavelength of the light source, and a light-receiving element that receives the light transmitted by the bandpass filter.

The bandpass filter transmits light in a wavelength range including light having an emission peak wavelength of the light source, and reflects light in a wavelength range on the long wavelength side and the short wavelength side of the wavelength range to thereby extract the light having an emission peak wavelength of the light source.

Light Source

The light source used for the sensor is not particularly limited, and various known light sources used as the light source in an optical sensor can be used.

Examples of the light source include a light bulb such as a mercury lamp, a fluorescent lamp, a halogen lamp, a light emitting diode (LED), and a laser such as a semiconductor laser.

The emitted light of the light source may be diffused light or parallel light such as a collimated light beam. In addition, in the sensor, the light emitted by the light source may be scanned one-dimensionally or two-dimensionally, if necessary.

Above all, from the viewpoint of improving the SN ratio of the sensor, it is preferable to use a light emitting diode (LED) and a laser such as a semiconductor laser that can carry out narrow band light irradiation.

In addition, from the viewpoint of improving the SN ratio of the sensor, the half-width of the luminescence peak of the light source is preferably 30 nm or less, more preferably 15 nm or less, and still more preferably 10 nm or less.

Here, in a case where the light source is a light emitting diode (LED) or a laser such as a semiconductor laser, the rate of change in the luminescence wavelength (peak wavelength) depending on the temperature is about 0.1 to 0.7 nm/° C.

The wavelength of the light emitted by the light source is not particularly limited, and may be visible light or invisible light such as infrared rays and ultraviolet rays. Among them, infrared rays, which are invisible light, are suitably used as light emitted by a light source.

The light emitted by the light source may be unpolarized light or polarized light. In a case where the light source emits polarized light, the emitted light may be linearly polarized light or circularly polarized light.

Light-Receiving Element

The light-receiving element has a function of receiving the measurement light emitted by a light source and reflected by an object through a bandpass filter.

The light-receiving element is not particularly limited, and any of various known light-receiving elements (photodetectors (elements)) used as the light-receiving element in an optical sensor can be used.

Examples of the light-receiving element include a complementary metal oxide semiconductor (CMOS) sensor and a charge-coupled device (CCD) sensor.

The light-receiving element may not have spatial resolution, and is preferably a line sensor that detects light in a line shape or an area sensor that detects light two-dimensionally, among which an area sensor is particularly preferable.

As the above-mentioned measurement of an object by a sensor, various known measurements carried out by an optical sensor can be used. Therefore, the object is not limited and may be a person, an animal, or a thing.

Examples of the measurement of the object include measurement of a distance to an object (distance measurement), measurement of a shape of an object, measurement of movement of an object, and identification of an object. All of these measurements may be known measurement methods, and for example, the sensor may be a sensor that measures the distance to an object by a time of flight (ToF) method.

More specifically, the measurement of a distance to an object or the like can be carried out in such a way that the measurement light emitted by the light source and reflected by the object is measured by the light-receiving element through the bandpass filter, and the photometric result is analyzed. At that time, since external light such as sunlight and lighting incident on the sensor does not pass through the bandpass filter, the external light incident on the light-receiving element can be cut by the bandpass filter and therefore noise can be suppressed.

The above sensor can be used for all purposes, such as a sensor that selects only the wavelength that contains the required information. For example, the sensor can be used as a wavelength selection element for optical communication used in the communication field as described in WO2018/010675A.

Although the bandpass filter and the sensor according to the embodiment of the present invention has been described in detail above, the present invention is not limited to the above-mentioned examples, and various improvements or modifications may also be made without departing from the spirit and scope of the present invention.

EXAMPLES

The features of the present invention will be described in more detail with reference to the following examples. The materials, reagents, used amounts, substance amounts, ratios, treatment details, treatment procedures, and the like shown in the following Examples can be appropriately changed without departing from the spirit of the present invention. Therefore, the scope of the present invention should not be construed as being limited by the specific examples described below.

Raw Material

The following raw materials were used to prepare a liquid crystal composition for forming a cholesteric liquid crystal layer.

Rod-Like Liquid Crystal Compound

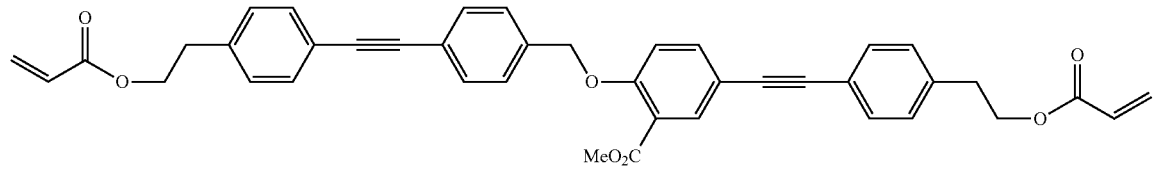

LC-1

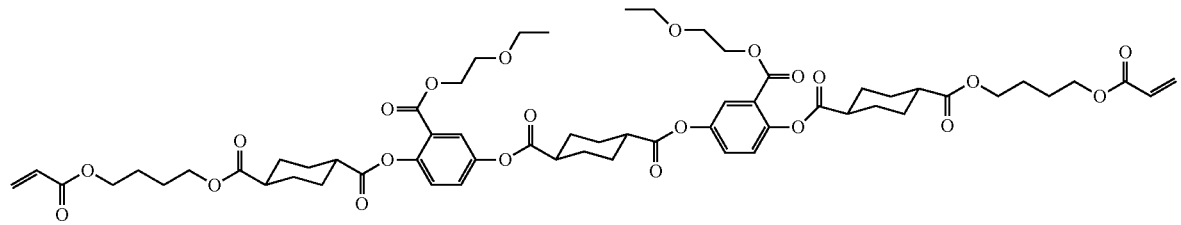

LC-2

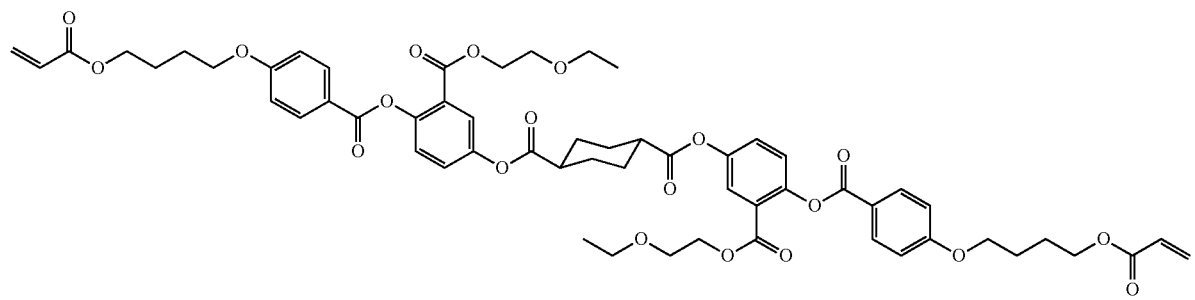

LC-3

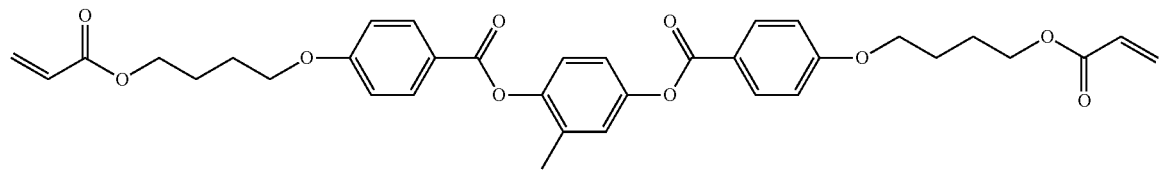

LC-4

-continued
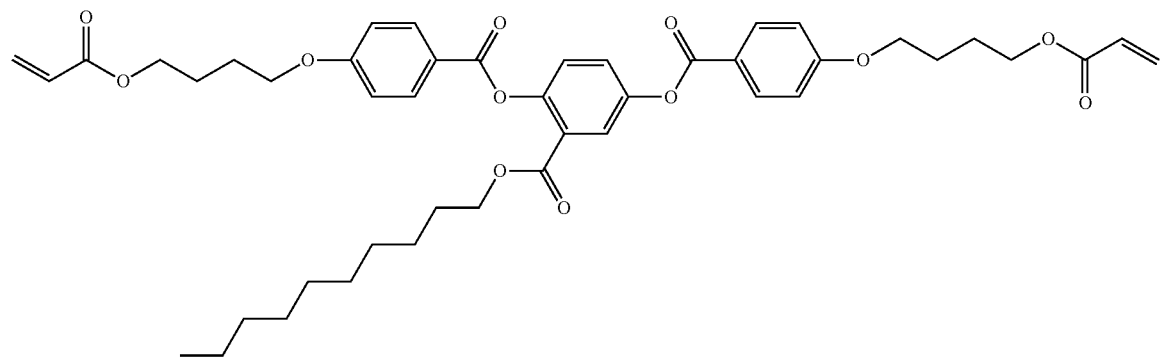
LC-5
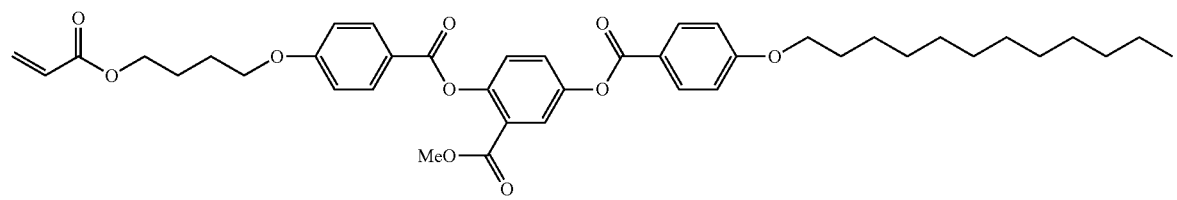
LC-6
Chiral Agent
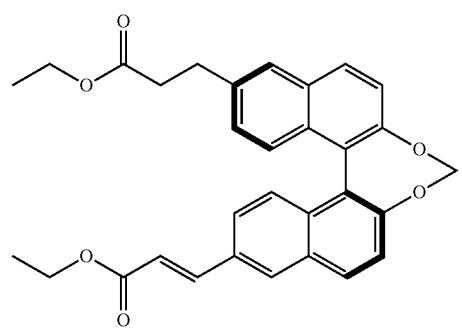
CD-1
-continued
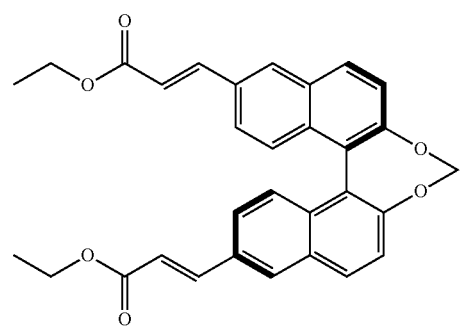
CD-2
Leveling Agent
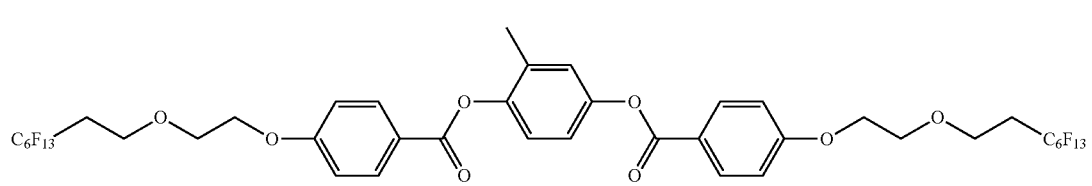
S-1

Polymerization Initiator
Irgacure (registered trademark) OXE 01 (manufactured by BASF SE) Solvent
Chloroform Example 1

Preparation of liquid crystal composition for forming cholesteric liquid crystal layer A liquid crystal composition having the composition shown in Table 1 below was prepared as the liquid crystal composition for forming a cholesteric liquid crystal layer.

Table 1 shows the composition of the liquid crystal composition used for forming the cholesteric liquid crystal layer. The columns of "Reflective member" and "Cholesteric liquid crystal layer" in the column of "Layer configuration" in Table 1 indicate the reflective member and cholesteric liquid crystal layer formed by using the liquid crystal composition shown in the column of "Liquid crystal composition" in each Examples and each Comparative Examples. In addition, the numerical value shown in each component column of "Composition of liquid crystal composition" indicates the amount (unit mass part) of the raw material component used in the preparation of the liquid crystal composition, and the column of "Concentration of solid contents" indicates the content (unit mass %) of components other than the solvent contained in the prepared liquid crystal composition. In a case of preparing each liquid crystal composition, either the chiral agent CD-1 or the chiral agent CD-2 was used according to the polarization characteristics of the light reflected by the cholesteric liquid crystal layer to be formed.

For example, in Example 1, 100 parts by mass of the rod-like liquid crystal compound LC-1, 3.0 parts by mass of the chiral agent CD-1 (or the chiral agent CD-2), 3.0 parts by mass of the polymerization initiator OXE 01, 0.1 parts by mass of the leveling agent S-1, and chloroform having a concentration of solid contents of 29% by mass were mixed to prepare a liquid crystal composition for forming "First cholesteric liquid crystal layer" of "Reflective member A".

TABLE 1

| Table 1 (1) | Layer configuration | | Composition of liquid crystal composition | | | | | | | | | |
|---|---|---|---|---|---|---|---|---|---|---|---|---|
| | Reflective member | Cholesteric liquid crystal layer | LC-1 | LC-2 | LC-3 | LC-4 | LC-5 | LC-6 | CD-1 or CD-2 | OXE01 | S-1 | Concentration of solid contents |
| Example 1 | A | First | 100 | | | | | | 3.0 | 3.0 | 0.1 | 29% |
| | | Second | | 75 | 25 | | | | 1.9 | 3.0 | 0.1 | 13% |
| | B | Third | 100 | | | | | | 2.5 | 3.0 | 0.1 | 29% |
| | | Fourth | | 75 | 25 | | | | 1.7 | 3.0 | 0.1 | 13% |
| Example 2 | A | First | 100 | | | | | | 3.0 | 3.0 | 0.1 | 29% |
| | | Second | | 50 | 50 | | | | 2.0 | 3.0 | 0.1 | 13% |
| | B | Third | 100 | | | | | | 2.5 | 3.0 | 0.1 | 29% |
| | | Fourth | | 50 | 50 | | | | 1.7 | 3.0 | 0.1 | 13% |
| Example 3 | A | First | 100 | | | | | | 3.0 | 3.0 | 0.1 | 29% |
| | | Second | | 25 | 75 | | | | 2.1 | 3.0 | 0.1 | 13% |
| | B | Third | 100 | | | | | | 2.5 | 3.0 | 0.1 | 29% |
| | | Fourth | | 25 | 75 | | | | 1.7 | 3.0 | 0.1 | 13% |
| Example 4 | A | First | 100 | | | | | | 3.0 | 3.0 | 0.1 | 29% |
| | | Second | | 25 | 50 | 25 | | | 2.1 | 3.0 | 0.1 | 13% |
| | B | Third | 100 | | | | | | 2.5 | 3.0 | 0.1 | 29% |
| | | Fourth | | 25 | 50 | 25 | | | 1.8 | 3.0 | 0.1 | 13% |
| Example 5 | A | First | 100 | | | | | | 3.0 | 3.0 | 0.1 | 29% |
| | | Second | | | 75 | 25 | | | 2.1 | 3.0 | 0.1 | 13% |
| | B | Third | 100 | | | | | | 2.5 | 3.0 | 0.1 | 29% |
| | | Fourth | | | 75 | 25 | | | 1.8 | 3.0 | 0.1 | 13% |
| Example 6 | A | First | 100 | | | | | | 3.0 | 3.0 | 0.1 | 29% |
| | | Second | | | 50 | 50 | | | 2.2 | 3.0 | 0.1 | 13% |
| | B | Third | 100 | | | | | | 2.5 | 3.0 | 0.1 | 29% |
| | | Fourth | | | 50 | 50 | | | 1.9 | 3.0 | 0.1 | 13% |
| Example 7 | A | First | 100 | | | | | | 3.0 | 3.0 | 0.1 | 29% |
| | | Second | | | | 100 | | | 2.3 | 3.0 | 0.1 | 13% |
| | B | Third | 100 | | | | | | 2.5 | 3.0 | 0.1 | 29% |
| | | Fourth | | | | 100 | | | 1.9 | 3.0 | 0.1 | 13% |
| Example 8 | A | First | 100 | | | | | | 3.0 | 3.0 | 0.1 | 29% |
| | | Second | | 75 | 25 | | | | 2.1 | 3.0 | 0.1 | 16% |
| | B | Third | 100 | | | | | | 2.5 | 3.0 | 0.1 | 29% |
| | | Fourth | | 75 | 25 | | | | 1.8 | 3.0 | 0.1 | 16% |
| Example 9 | A | First | 100 | | | | | | 3.0 | 3.0 | 0.1 | 29% |
| | | Second | | 75 | 25 | | | | 2.1 | 3.0 | 0.1 | 11% |
| | B | Third | 100 | | | | | | 2.5 | 3.0 | 0.1 | 29% |
| | | Fourth | | 75 | 25 | | | | 1.8 | 3.0 | 0.1 | 11% |
| Example 10 | A | First | 100 | | | | | | 3.0 | 3.0 | 0.1 | 29% |
| | | Second | | 75 | 25 | | | | 2.1 | 3.0 | 0.1 | 4% |
| | B | Third | 100 | | | | | | 2.5 | 3.0 | 0.1 | 29% |
| | | Fourth | | 75 | 25 | | | | 1.8 | 3.0 | 0.1 | 4% |

TABLE 2

| Table 1 (2) | Layer configuration Reflective member | Cholesteric liquid crystal layer | Composition of liquid crystal composition | | | | | | | | | Concentration of solid contents |
|---|---|---|---|---|---|---|---|---|---|---|---|---|
| | | | LC-1 | LC-2 | LC-3 | LC-4 | LC-5 | LC-6 | CD-1 or CD-2 | OXE01 | S-1 | |
| Example 11 | A | First | 100 | | | | | | 3.0 | 3.0 | 0.1 | 29% |
| | | Second | | | 75 | 25 | | | 2.1 | 3.0 | 0.1 | 13% |
| | B | Third | 100 | | | | | | 2.5 | 3.0 | 0.1 | 29% |
| | | Fourth | | | 75 | 25 | | | 1.8 | 3.0 | 0.1 | 13% |
| Example 12 | A | First | 100 | | | | | | 3.0 | 3.0 | 0.1 | 29% |
| | | Second | | | 75 | 25 | | | 2.2 | 3.0 | 0.1 | 13% |
| | B | Third | 100 | | | | | | 2.5 | 3.0 | 0.1 | 29% |
| | | Fourth | | | 75 | 25 | | | 1.8 | 3.0 | 0.1 | 13% |
| Example 13 | A | First | 100 | | | | | | 3.1 | 3.0 | 0.1 | 29% |
| | | Second | | | 75 | 25 | | | 2.2 | 3.0 | 0.1 | 12% |
| | B | Third | 100 | | | | | | 2.5 | 3.0 | 0.1 | 29% |
| | | Fourth | | | 75 | 25 | | | 1.8 | 3.0 | 0.1 | 12% |
| Example 14 | A | First | 100 | | | | | | 3.2 | 3.0 | 0.1 | 29% |
| | | Second | | | 75 | 25 | | | 2.3 | 3.0 | 0.1 | 12% |
| | B | Third | 100 | | | | | | 2.4 | 3.0 | 0.1 | 29% |
| | | Fourth | | | 75 | 25 | | | 1.7 | 3.0 | 0.1 | 12% |
| Example 15 | A | First | 100 | | | | | | 3.0 | 3.0 | 0.1 | 34% |
| | | Second | 20 | | | 80 | | | 2.4 | 3.0 | 0.1 | 19% |
| | | Fifth | | 50 | 50 | | | | 2.0 | 3.0 | 0.1 | 16% |
| | B | Third | 100 | | | | | | 2.5 | 3.0 | 0.1 | 34% |
| | | Fourth | 20 | | | 80 | | | 2.0 | 3.0 | 0.1 | 19% |
| | | Sixth | | 50 | 50 | | | | 1.7 | 3.0 | 0.1 | 16% |
| Example 16 | A | First | 20 | | | 80 | | | 2.3 | 3.0 | 0.1 | 31% |
| | | Second | | 25 | 75 | | | | 2.0 | 3.0 | 0.1 | 14% |
| | B | Third | 20 | | | 80 | | | 2.0 | 3.0 | 0.1 | 31% |
| | | Fourth | | 25 | 75 | | | | 1.8 | 3.0 | 0.1 | 14% |
| Example 17 | A | First | 25 | 50 | 25 | | | | 2.1 | 3.0 | 0.1 | 32% |
| | | Second | | 50 | 50 | | | | 1.9 | 3.0 | 0.1 | 16% |
| | B | Third | 25 | 50 | 25 | | | | 1.8 | 3.0 | 0.1 | 32% |
| | | Fourth | | 50 | 50 | | | | 1.7 | 3.0 | 0.1 | 16% |
| Example 18 | A | First | 50 | | | | 25 | 25 | 2.4 | 3.0 | 0.1 | 32% |
| | | Second | | 50 | 50 | | | | 2.0 | 3.0 | 0.1 | 16% |
| | B | Third | 50 | | | | 25 | 25 | 2.1 | 3.0 | 0.1 | 32% |
| | | Fourth | | 50 | 50 | | | | 1.7 | 3.0 | 0.1 | 16% |
| Comparative Example 1 | A | First | 100 | | | | | | 3.0 | 3.0 | 0.1 | 29% |
| | B | Third | 100 | | | | | | 2.5 | 3.0 | 0.1 | 29% |

Formation of bandpass filter for dextrorotatory circularly polarized light

Step 1

A composition for forming a polyimide alignment film "SE-130" (manufactured by Nissan Chemical Corporation) was applied onto a washed glass substrate to form a coating film. The obtained coating film was baked and then subjected to a rubbing treatment to prepare a substrate with an alignment film.

30 μL of a liquid crystal composition for forming a second cholesteric liquid crystal layer (containing the chiral agent CD-1) shown in Table 1 was spin-coated on the rubbing-treated surface of the alignment film under the conditions of a rotation speed of 1,500 rpm for 10 seconds to form a composition layer, and then the formed composition layer was dried (aged) at 80° C. for 1 minute to align a liquid crystal compound.

Step 2

The composition layer in which the liquid crystal compound was aligned was subjected to a curing treatment by irradiating the composition layer with ultraviolet rays (mercury lamp) at an irradiation amount of 500 mJ/cm$^2$ under a nitrogen atmosphere at 70° C. As a result, the second cholesteric liquid crystal layer was formed.

The first cholesteric liquid crystal layer, the second cholesteric liquid crystal layer, the fourth cholesteric liquid crystal layer, the third cholesteric liquid crystal layer, and the fourth cholesteric liquid crystal layer were laminated in this order on the formed second cholesteric liquid crystal layer to obtain a bandpass filter for dextrorotatory circularly polarized light, in the same manner as above except that the corresponding liquid crystal composition shown in Table 1 was applied and cured to form each cholesteric liquid crystal layer, and the coating amount of the liquid crystal composition was adjusted such that the thickness of the cholesteric liquid crystal layer formed at that time was the thickness shown in Table 2 which will be given later.

Regarding the application of the first cholesteric liquid crystal layer, the second cholesteric liquid crystal layer, the fourth cholesteric liquid crystal layer, the third cholesteric liquid crystal layer, and the fourth cholesteric liquid crystal layer, the alignment of the applied liquid crystal layer was promoted by applying the alignment function of the surface of the underlying liquid crystal layer, and each liquid crystal composition was applied without forming an alignment film.

The bandpass filter for dextrorotatory circularly polarized light obtained by application of the liquid crystal composition without forming an alignment film has the second cholesteric liquid crystal layer arranged on both main surfaces of the first cholesteric liquid crystal layer, and the fourth cholesteric liquid crystal layer arranged on both main surfaces of the laminate $A_R$ that reflects dextrorotatory circularly polarized light and on both main surfaces of the third cholesteric liquid crystal layer, and includes a laminate $B_R$ that reflects dextrorotatory circularly polarized light.

Formation of all-Optical Bandpass Filter

The second cholesteric liquid crystal layer, the first cholesteric liquid crystal layer, the second cholesteric liquid crystal layer, the fourth cholesteric liquid crystal layer, the third cholesteric liquid crystal layer, and the fourth cholesteric liquid crystal layer were laminated in this order on the fourth cholesteric liquid crystal layer of the bandpass filter for dextrorotatory circularly polarized light by application of the liquid crystal composition without forming an alignment film to prepare an all-optical bandpass filter 1 of Example 1, according to the above-mentioned method for forming each cholesteric liquid crystal layer, except that each cholesteric liquid crystal layer was formed using the liquid crystal composition for forming a cholesteric liquid crystal layer containing the chiral agent CD-2 instead of the liquid crystal composition for forming a cholesteric liquid crystal layer containing the chiral agent CD-1.

The all-optical bandpass filter 1 of Example 1 has the second cholesteric liquid crystal layer arranged on both main surfaces of the laminate $A_R$, on both main surfaces of the laminate $B_R$, and on both main surfaces of the first cholesteric liquid crystal layer, and the fourth cholesteric liquid crystal layer arranged on both main surfaces of the laminate $A_L$ that reflects levorotatory circularly polarized light and on both main surfaces of the third cholesteric liquid crystal layer, and includes a laminate $B_L$ that reflects levorotatory circularly polarized light.

In addition, the all-optical bandpass filter 1 of Example 1 includes the above-mentioned laminate $A_R$ and laminate $A_L$ as the reflective member A, and the above-mentioned laminate $B_R$ and laminate $B_L$ as the reflective member B.

Characteristics of Cholesteric Liquid Crystal Layer

The characteristics of each cholesteric liquid crystal layer constituting the bandpass filter were determined by the following method.

Specifically, the liquid crystal composition for forming a cholesteric liquid crystal layer shown in Table 1 was applied onto the substrate with an alignment film to prepare a sample having a cholesteric liquid crystal layer alone, and the obtained sample was measured using a UV-Vis-NIR spectrophotometer ("UV-3100", manufactured by Shimadzu Corporation) to measure the reflection spectrum of the cholesteric liquid crystal layer. The reflection center wavelengths $\lambda_1$ to $\lambda_6$ of each cholesteric liquid crystal layer were obtained from the obtained reflection spectrum. Next, the average refractive index n of the cholesteric liquid crystal layer was regarded as 1.55, and the helical pitch of each cholesteric liquid crystal layer was calculated from the obtained reflection center wavelengths $\lambda_1$ to $\lambda_6$. In addition, the thickness (μm) of each cholesteric liquid crystal layer was measured using an interference film thickness meter BW-A501 (manufactured by Nikon Corporation).

The average refractive index n, thickness, and helical pitch of the cholesteric liquid crystal layer obtained above were set as fixed values, and Δn was changed as a variable to calculate the reflection spectrum. Optimization was carried out such that the error from the measured value of the reflection spectrum was minimized, and the obtained optimum value was defined as the birefringence Δn of each cholesteric liquid crystal layer (cholesteric liquid crystalline phase). Δn LCD Master 1D (manufactured by Shintec Co., Ltd., Ver 9.8.0.0) was used for the calculation of the reflection spectrum.

Measurement and Evaluation of Bandpass Filter

The transmission spectrum of the all-optical bandpass filter 1 prepared by the above method was measured using a UV-Vis-NIR spectrophotometer ("UV-3100", manufactured by Shimadzu Corporation).

As a result, it was confirmed that the all-optical bandpass filter 1 of Example 1 has a reflection band having a reflection center wavelength $\lambda_A$ of 838 nm and a half width at half maximum of 59 nm, corresponding to the reflective member A and a reflection band having a reflection center wavelength $\lambda_B$ of 985 nm and a half width at half maximum of 71 nm, corresponding to the reflective member B.

In addition, it was confirmed that the all-optical bandpass filter 1 of Example 1 has a transmission band having a transmission center wavelength $\lambda_T$ of 906 nm and a full width at half maximum of 30 nm.

Further, the transmission performance of the all-optical bandpass filter 1 prepared in Example 1 was evaluated. The evaluation results are shown in Table 2 which will be given later.

Evaluation Standards for Transmittance

Of all the transmission bands, a band having a light transmittance of 80% or more (hereinafter, also referred to as "high transmission band") was obtained, and the transmittance of the bandpass filter was evaluated from the range (unit: nm) where the high transmission band was continuous based on the following evaluation standards. In a case where there are a plurality of continuous high transmission bands, the evaluation was carried out by adopting the maximum value in the range in which the high transmission band is continuous.

A: The range in which the high transmission band is continuous is 20 nm or more.

B: The range in which the high transmission band is continuous is 15 nm or more and less than 20 nm.

C: The range in which the high transmission band is continuous is 10 nm or more and less than 15 nm.

D: There is a high transmission band, but the range in which the high transmission band is continuous is less than 10 nm.

E: There is no high transmission band.

Evaluation Standards for High Transmission Band Ratio

With regard to a high transmission band ratio of the bandpass filter, a ratio of the range in which the high transmission band is continuous to the range (unit: nm) in which the band having a light transmittance of 50% or more in the transmission band is continuous was calculated and evaluated based on the following evaluation standards. In a case where there are a plurality of bands having a light transmittance of 50% or more continuously, the evaluation is carried out by adopting the maximum value in the range in which the band having a light transmittance of 50% or more is continuous.

Evaluation Standards for High Transmission Band Ratio

A: The high transmission band ratio is 75% or more.

B: The high transmission band ratio is 60% or more and less than 75%.

C: The high transmission band ratio is 40% or more and less than 60%.

D: The high transmission band ratio is 1% or more and less than 40%.

E: The high transmission band ratio is less than 1% or there is no band having a light transmittance of 80% or more.

Examples 2 to 18 and Comparative Example 1

According to the method described in Example 1, the liquid crystal composition shown in Table 1 above was used to prepare an all-optical bandpass filter provided with the cholesteric liquid crystal layer shown in Table 2 below, and the obtained bandpass filter was measured and evaluated.

Table 1 above shows the composition of the liquid crystal composition for forming a cholesteric liquid crystal layer used in each Example and Comparative Example. In addition, Table 2 below shows the evaluation results of the layer configuration, the characteristics of each cholesteric liquid crystal layer, the characteristics of the reflection band, the characteristics of the transmission band, and the transmission performance for the bandpass filters prepared in each Example and Comparative Example.

In Table 2, the column of "Layer configuration" indicates the configuration of the reflective member and the cholesteric liquid crystal layer included in each bandpass filter. In Table 2, only the configuration of a set of laminates for dextrorotatory circularly polarized light consisting of the first cholesteric liquid crystal layer and the second cholesteric liquid crystal layer is described as the reflective member A, and only the configuration of a set of laminates for dextrorotatory circularly polarized light consisting of the third cholesteric liquid crystal layer and the fourth cholesteric liquid crystal layer is described as the reflective member B, but in each Example and each Comparative Example, a bandpass filter including the above-mentioned laminate for dextrorotatory circularly polarized light and a laminate for levorotatory circularly polarized light having the same configuration as the laminate for dextrorotatory circularly polarized light was prepared.

In Table 2, the column of "Characteristics of cholesteric liquid crystal layer" indicates the thickness d (d1 to d6, unit: μm), the birefringence Δn (Δn1 to Δn6), and the reflection center wavelength ($\lambda_1$ to $\lambda_6$, unit: nm) of each of the first to sixth cholesteric liquid crystal layers constituting the reflective member A or B.

In Table 2, the column of "Reflection center wavelength" and the column of "Half width at half maximum" in the column of "Characteristics of reflection band" indicate the numerical values of reflection center wavelength ($\lambda_A$ and $\lambda_B$, unit: nm) and the half width at half maximum (unit: nm) calculated from the transmission spectrum of each bandpass filter for each reflection band corresponding to the reflective member A or B. The column of "Δn ratio" indicates a ratio (Δn2/Δn1) of the birefringence Δn2 of the second cholesteric liquid crystal layer to the birefringence Δn1 of the first cholesteric liquid crystal layer in the reflective member A, or a ratio (Δn4/Δn3) of the birefringence Δn4 of the fourth cholesteric liquid crystal layer to the birefringence Δn3 of the third cholesteric liquid crystal layer in the reflective member B. The column of "Thickness d ratio" indicates a ratio (d2/d1) of the thickness d2 of the second cholesteric liquid crystal layer to the thickness d1 of the first cholesteric liquid crystal layer in the reflective member A, or a ratio (d4/d3) of the thickness d4 of the fourth cholesteric liquid crystal layer to the thickness d3 of the third cholesteric liquid crystal layer in the reflective member B.

In Table 2, the column of "Transmission center wavelength" and the column of "Full width at half maximum" in the column of "Characteristics of transmission band" indicate the numerical values of the transmission center wavelength $\lambda_T$ (unit: nm) and the full width at half maximum (unit: nm) of the transmission band of each bandpass filter. The column of "full width at half maximum/center wavelength ratio" indicates a ratio of the full width at half maximum of the transmission band to the center wavelength of the transmission band.

TABLE 3

| | | | Characteristics of cholesteric liquid crystal layer | | | | Characteristics of reflection band | | | | Characteristics of transmission band | | | Evaluation results | |
|---|---|---|---|---|---|---|---|---|---|---|---|---|---|---|---|---|
| Table 2 (1) | Reflective member | Cholesteric liquid crystal layer | Thickness d [μm] | Birefringence Δn | Reflection center wavelength [nm] | Reflection center wavelength [nm] | Half width at half maximum [nm] | Δn ratio | Thickness d ratio | Transmission center wavelength [nm] | Full width at half maximum [nm] | Full width at half maximum/center wavelength ratio | Transmittance | Hight transmission band ratio |
| Example 1 | A | Second | 1.8 | 0.04 | 838 | 838 | 59 | 0.21 | 0.36 | 906 | 17 | 1.9% | D | C |
| | | First | 5.0 | 0.20 | 838 | | | | | | | | | |
| | | Second | 1.8 | 0.04 | 838 | | | | | | | | | |
| | B | Fourth | 1.8 | 0.04 | 985 | 985 | 71 | 0.21 | 0.36 | | | | | |
| | | Third | 5.0 | 0.20 | 985 | | | | | | | | | |
| | | Fourth | 1.8 | 0.04 | 985 | | | | | | | | | |
| Example 2 | A | Second | 1.8 | 0.06 | 838 | 838 | 57 | 0.31 | 0.36 | 906 | 21 | 2.3% | C | C |
| | | First | 5.0 | 0.20 | 838 | | | | | | | | | |
| | | Second | 1.8 | 0.06 | 838 | | | | | | | | | |
| | B | Fourth | 1.8 | 0.06 | 985 | 985 | 69 | 0.31 | 0.36 | | | | | |
| | | Third | 5.0 | 0.20 | 985 | | | | | | | | | |
| | | Fourth | 1.8 | 0.06 | 985 | | | | | | | | | |
| Example 3 | A | Second | 1.8 | 0.08 | 838 | 838 | 55 | 0.41 | 0.36 | 906 | 25 | 2.8% | B | B |
| | | First | 5.0 | 0.20 | 838 | | | | | | | | | |
| | | Second | 1.8 | 0.08 | 838 | | | | | | | | | |
| | B | Fourth | 1.8 | 0.08 | 985 | 985 | 67 | 0.41 | 0.36 | | | | | |
| | | Third | 5.0 | 0.20 | 985 | | | | | | | | | |
| | | Fourth | 1.8 | 0.08 | 985 | | | | | | | | | |
| Example 4 | A | Second | 1.8 | 0.10 | 838 | 838 | 52 | 0.50 | 0.36 | 906 | 31 | 3.4% | B | B |
| | | First | 5.0 | 0.20 | 838 | | | | | | | | | |
| | | Second | 1.8 | 0.10 | 838 | | | | | | | | | |
| | B | Fourth | 1.8 | 0.10 | 985 | 985 | 64 | 0.50 | 0.36 | | | | | |
| | | Third | 5.0 | 0.20 | 985 | | | | | | | | | |
| | | Fourth | 1.8 | 0.10 | 985 | | | | | | | | | |
| Example 5 | A | Second | 1.8 | 0.11 | 838 | 838 | 50 | 0.55 | 0.36 | 905 | 34 | 3.8% | A | B |
| | | First | 5.0 | 0.20 | 838 | | | | | | | | | |
| | | Second | 1.8 | 0.11 | 838 | | | | | | | | | |
| | B | Fourth | 1.8 | 0.11 | 985 | 985 | 63 | 0.55 | 0.36 | | | | | |
| | | Third | 5.0 | 0.20 | 985 | | | | | | | | | |
| | | Fourth | 1.8 | 0.11 | 985 | | | | | | | | | |

TABLE 4

| | | | Characteristics of cholesteric liquid crystal layer | | | Characteristics of reflection band | | | | Characteristics of transmission band | | | Evaluation results | |
|---|---|---|---|---|---|---|---|---|---|---|---|---|---|---|
| | Layer configuration | | | | | | | | | | | | | |
| Table 2 (2) | Reflective member | Cholesteric liquid crystal layer | Thickness d [μm] | Birefringence Δn | Reflection center wavelength [nm] | Reflection center wavelength [nm] | Half width at half maximum [nm] | Δn ratio | Thickness d ratio | Transmission center wavelength [nm] | Full width at half maximum [nm] | Full widthat half maximum/center wavelength ratio | Transmittance | Hight transmission band ratio |
| Example 6 | A | Second | 1.8 | 0.12 | 838 | 838 | 52 | 0.60 | 0.36 | 906 | 32 | 3.5% | A | B |
| | | First | 5.0 | 0.20 | 838 | | | | | | | | | |
| | | Second | 1.8 | 0.12 | 838 | | | | | | | | | |
| | B | Fourth | 1.8 | 0.12 | 985 | 985 | 63 | 0.60 | 0.36 | | | | | |
| | | Third | 5.0 | 0.20 | 985 | | | | | | | | | |
| | | Fourth | 1.8 | 0.12 | 985 | | | | | | | | | |
| Example 7 | A | Second | 1.8 | 0.14 | 838 | 838 | 52 | 0.70 | 0.36 | 906 | 32 | 3.5% | B | C |
| | | First | 5.0 | 0.20 | 838 | | | | | | | | | |
| | | Second | 1.8 | 0.14 | 838 | | | | | | | | | |
| | B | Fourth | 1.8 | 0.14 | 985 | 985 | 63 | 0.70 | 0.36 | | | | | |
| | | Third | 5.0 | 0.20 | 985 | | | | | | | | | |
| | | Fourth | 1.8 | 0.14 | 985 | | | | | | | | | |
| Example 8 | A | Second | 1.8 | 0.11 | 838 | 838 | 50 | 0.55 | 0.50 | 906 | 36 | 4.0% | B | C |
| | | First | 5.0 | 0.20 | 838 | | | | | | | | | |
| | | Second | 1.8 | 0.11 | 838 | | | | | | | | | |
| | B | Fourth | 1.8 | 0.11 | 985 | 985 | 61 | 0.55 | 0.50 | | | | | |
| | | Third | 5.0 | 0.20 | 985 | | | | | | | | | |
| | | Fourth | 1.8 | 0.11 | 985 | | | | | | | | | |
| Example 9 | A | Second | 1.8 | 0.11 | 838 | 838 | 56 | 0.55 | 0.28 | 906 | 23 | 2.5% | D | D |
| | | First | 5.0 | 0.20 | 838 | | | | | | | | | |
| | | Second | 1.8 | 0.11 | 838 | | | | | | | | | |
| | B | Fourth | 1.8 | 0.11 | 985 | 985 | 68 | 0.55 | 0.28 | | | | | |
| | | Third | 5.0 | 0.20 | 985 | | | | | | | | | |
| | | Fourth | 1.8 | 0.11 | 985 | | | | | | | | | |
| Example 10 | A | Second | 1.8 | 0.11 | 838 | 838 | 57 | 0.55 | 0.36 | 906 | 21 | 2.3% | D | D |
| | | First | 5.0 | 0.20 | 838 | | | | | | | | | |
| | B | Fourth | 1.8 | 0.11 | 985 | 985 | 69 | 0.55 | 0.36 | | | | | |
| | | Third | 5.0 | 0.20 | 985 | | | | | | | | | |

TABLE 5

| | | | Characteristics of cholesteric liquid crystal layer | | | | Characteristics of reflection band | | | | Characteristics of transmission band | | | Evaluation results | |
|---|---|---|---|---|---|---|---|---|---|---|---|---|---|---|---|---|
| Table 2 (2) | Layer configuration | | Thickness d [μm] | Birefringence Δn | Reflection center wavelength [nm] | Reflection center wavelength [nm] | Half width at half maximum [nm] | Δn ratio | Thickness d ratio | Transmission center wavelength [nm] | Full width at half maximum [nm] | Full widthat half maximum/center wavelength ratio | Transmittance | Hight transmission band ratio |
| | Reflective member | Cholesteric liquid crystal layer | | | | | | | | | | | | |
| Example 11 | A | Second | 1.8 | 0.11 | 848 | 840 | 54 | 0.55 | 0.36 | 908 | 28 | 3.1% | C | D |
| | | First | 5.0 | 0.20 | 838 | | | | | | | | | |
| | | Second | 1.8 | 0.11 | 848 | | | | | | | | | |
| | B | Fourth | 1.8 | 0.11 | 995 | 987 | 65 | 0.55 | 0.36 | | | | | |
| | | Third | 5.0 | 0.20 | 985 | | | | | | | | | |
| | | Fourth | 1.8 | 0.11 | 995 | | | | | | | | | |
| Example 12 | A | Second | 1.8 | 0.11 | 818 | 837 | 54 | 0.55 | 0.36 | 906 | 29 | 3.2% | D | D |
| | | First | 5.0 | 0.20 | 838 | | | | | | | | | |
| | | Second | 1.8 | 0.11 | 818 | | | | | | | | | |
| | B | Fourth | 1.8 | 0.11 | 965 | 984 | 64 | 0.55 | 0.36 | | | | | |
| | | Third | 5.0 | 0.20 | 858 | | | | | | | | | |
| | | Fourth | 1.8 | 0.11 | 965 | | | | | | | | | |
| Example 13 | A | Second | 1.6 | 0.11 | 813 | 813 | 52 | 0.55 | 0.32 | 906 | 82 | 9.1% | A | A |
| | | First | 5.0 | 0.20 | 813 | | | | | | | | | |
| | | Second | 1.6 | 0.11 | 813 | | | | | | | | | |
| | B | Fourth | 1.6 | 0.11 | 1015 | 1015 | 68 | 0.55 | 0.32 | | | | | |
| | | Third | 5.0 | 0.20 | 1015 | | | | | | | | | |
| | | Fourth | 1.6 | 0.11 | 1015 | | | | | | | | | |
| Example 14 | A | Second | 1.6 | 0.11 | 783 | 783 | 51 | 0.55 | 0.32 | 906 | 144 | 15.9% | B | D |
| | | First | 5.0 | 0.20 | 783 | | | | | | | | | |
| | | Second | 1.6 | 0.11 | 783 | | | | | | | | | |
| | B | Fourth | 1.6 | 0.11 | 1045 | 1045 | 67 | 0.55 | 0.32 | | | | | |
| | | Third | 5.0 | 0.20 | 1045 | | | | | | | | | |
| | | Fourth | 1.6 | 0.11 | 1045 | | | | | | | | | |

TABLE 6

| Table 2 (2) | Layer configuration | | | Characteristics of cholesteric liquid crystal layer | | | Characteristics of reflection band | | | | | Characteristics of transmission band | | | Evaluation results | |
|---|---|---|---|---|---|---|---|---|---|---|---|---|---|---|---|---|
| | Reflective member | Cholesteric liquid crystal layer | Thickness d [µm] | Birefringence Δn | Reflection center wavelength [nm] | Reflection center wavelength [nm] | Half width at half maximum [nm] | Δn ratio | Thickness d ratio | Transmission center wavelength [nm] | Full width at half maximum [nm] | Full width at half maximum/center wavelength ratio | Transmittance | Hight transmission band ratio |
| Example 15 | A | Fifth | 1.6 | 0.6 | 836 | 836 | 52 | 0.75 | 0.38 | 906 | 48 | 5.3% | A | A |
| | | Second | 1.8 | 0.15 | 836 | | | | | | | | | |
| | | First | 4.7 | 0.20 | 836 | | | | | | | | | |
| | | Second | 1.8 | 0.15 | 836 | | | | | | | | | |
| | | Fifth | 1.6 | 0.06 | 836 | | | | | | | | | |
| | B | Sixth | 1.6 | 0.06 | 1000 | 1000 | 64 | 0.75 | 0.38 | | | | | |
| | | Fourth | 1.8 | 0.15 | 1000 | | | | | | | | | |
| | | Third | 4.7 | 0.20 | 1000 | | | | | | | | | |
| | | Fourth | 1.8 | 0.15 | 1000 | | | | | | | | | |
| | | Sixth | 1.6 | 0.06 | 1000 | | | | | | | | | |
| Example 16 | A | Second | 2.1 | 0.08 | 848 | 848 | 43 | 0.53 | 0.38 | 908 | 34 | 3.8% | B | C |
| | | First | 5.5 | 0.15 | 848 | | | | | | | | | |
| | | Second | 2.1 | 0.08 | 848 | | | | | | | | | |
| | B | Fourth | 2.1 | 0.08 | 975 | 975 | 50 | 0.53 | 0.38 | | | | | |
| | | Third | 5.5 | 0.15 | 975 | | | | | | | | | |
| | | Fourth | 2.1 | 0.08 | 975 | | | | | | | | | |
| Example 17 | A | Second | 2.4 | 0.06 | 855 | 855 | 31 | 0.60 | 0.42 | 909 | 45 | 5.0% | C | D |
| | | First | 5.7 | 0.10 | 855 | | | | | | | | | |
| | | Second | 2.4 | 0.06 | 855 | | | | | | | | | |
| | B | Fourth | 2.4 | 0.06 | 967 | 967 | 36 | 0.60 | 0.42 | | | | | |
| | | Third | 5.7 | 0.10 | 967 | | | | | | | | | |
| | | Fourth | 2.4 | 0.06 | 967 | | | | | | | | | |
| Example 18 | A | Second | 2.5 | 0.06 | 855 | 855 | 33 | 0.55 | 0.44 | 910 | 41 | 4.5% | B | C |
| | | First | 5.7 | 0.10 | 855 | | | | | | | | | |
| | | Second | 2.5 | 0.06 | 855 | | | | | | | | | |
| | B | Fourth | 2.5 | 0.06 | 967 | 967 | 39 | 0.55 | 0.44 | | | | | |
| | | Third | 5.7 | 0.10 | 967 | | | | | | | | | |
| | | Fourth | 2.5 | 0.06 | 967 | | | | | | | | | |
| Comparative Example 1 | A | First | 5.0 | 0.20 | 838 | 838 | 60 | — | — | 905 | 13 | 1.4% | E | E |
| | B | Third | 5.0 | 0.20 | 985 | 985 | 74 | — | — | | | | | |

As shown in Table 2, it was confirmed that the bandpass filter according to the embodiment of the present invention is excellent in both the transmittance and the high transmission band ratio of the transmission band.

It was confirmed that the transmittance and the high transmission band ratio of the transmission band are more excellent in a case where the ratio (Δn2/Δn1) and the ratio (Δn4/Δn3) are more than 0.30; the transmittance and the high transmission band ratio of the transmission band are still more excellent in a case where the ratio (Δn2/Δn1) and the ratio (Δn4/Δn3) are more than 0.40; and both the transmittance and the high transmission band ratio of the transmission band are particularly excellent in a case where the ratio (Δn2/Δn1) and the ratio (Δn4/Δn3) are more than 0.50 (comparison of Examples 1 to 6).

It was confirmed that the transmittance and the high transmission band ratio of the transmission band are more excellent in a case where the ratio (Δn2/Δn1) and the ratio (Δn4/Δn3) are less than 0.70 (comparison of Examples 6 and 7).

It was confirmed that the transmittance and the high transmission band ratio of the transmission band are more excellent in a case where the ratio (d2/d1) of the thickness d2 of the second cholesteric liquid crystal layer to the thickness d1 of the first cholesteric liquid crystal layer and the ratio (d4/d3) of the thickness d4 of the fourth cholesteric liquid crystal layer to the thickness d3 of the third cholesteric liquid crystal layer are more than 0.30 and less than 0.50 (comparison of Examples 5, 8, and 9).

It was confirmed that the transmittance and the high transmission band ratio of the transmission band are more excellent in a case where the second cholesteric liquid crystal layer is laminated on both surfaces of the first cholesteric liquid crystal layer in the reflective member A and the fourth cholesteric liquid crystal layer is laminated on both surfaces of the third cholesteric liquid crystal layer in the reflective member B, as compared with a case where the second cholesteric liquid crystal layer is laminated on only one surface of the first cholesteric liquid crystal layer in the reflective member A and the fourth cholesteric liquid crystal layer is laminated on only one surface of the third cholesteric liquid crystal layer in the reflective member B (comparison of Examples 5 and 10).

It was confirmed that the high transmittance of the transmission band is more excellent in a case where the difference between the reflection center wavelength $\lambda_1$ of the first cholesteric liquid crystal layer and the reflection center wavelength $\lambda_2$ of the second cholesteric liquid crystal layer is less than 2.0% with respect to the reflection center wavelength $\lambda_1$, and the difference between the reflection center wavelength $\lambda_3$ of the third cholesteric liquid crystal layer and the reflection center wavelength $\lambda_4$ of the fourth cholesteric liquid crystal layer is less than 2.0% with respect to the reflection center wavelength $\lambda_1$; and it was confirmed that the transmittance and the high transmission band ratio of the transmission band are still more excellent in a case where the difference between the reflection center wavelength $\lambda_1$ of the first cholesteric liquid crystal layer and the reflection center wavelength $\lambda_2$ of the second cholesteric liquid crystal layer is less than 1.0% with respect to the reflection center wavelength $\lambda_1$, and the difference between the reflection center wavelength $\lambda_3$ of the third cholesteric liquid crystal layer and the reflection center wavelength $\lambda_4$ of the fourth cholesteric liquid crystal layer is less than 1.0% with respect to the reflection center wavelength $\lambda_1$ (comparison of Examples 5, 11, and 12).

It was confirmed that the transmittance and the high transmission band ratio of the transmission band are still more excellent in a case where the ratio of the full width at half maximum of the transmission band to the transmission center wavelength $\lambda_T$ of the transmission band is 15.0% or less (Comparison of Examples 5, 13, and 14).

It was confirmed that the high transmission band ratio of the transmission band is more excellent in a case where the birefringence Δn1 of the first cholesteric liquid crystal layer is 0.11 or more and the birefringence Δn3 of the third cholesteric liquid crystal layer is 0.11 or more, and it was confirmed that the transmittance and the high transmission band ratio of the transmission band are still more excellent in a case where the birefringence Δn1 of the first cholesteric liquid crystal layer is 0.17 or more and the birefringence Δn3 of the third cholesteric liquid crystal layer is 0.17 or more (comparison of Examples 5, 16, 17, and 18).

Example 19

In a case where a sample having the first cholesteric liquid crystal layer of the bandpass filter prepared in Example 18 alone was prepared according to the method described in the foregoing section of [Characteristics of cholesteric liquid crystal layer], and the thermal expansion coefficient of the first cholesteric liquid crystal layer was measured according to the above-mentioned method, the thermal expansion coefficient of the first cholesteric liquid crystal layer of Example 18 was 200 ppm/° C. As a result of carrying out the same measurement, the thermal expansion coefficient of the second to fourth cholesteric liquid crystal layers of the bandpass filter of Example 18 was 200 ppm/° C.

Using a laser that carries out irradiation with light having a wavelength of 905 nm at room temperature (25° C.), it was examined for the bandpass filter prepared in Example 18 whether or not the irradiation light could be transmitted while changing the temperature of the environment in which the bandpass filter and the laser are present. As a result, it was confirmed that the bandpass filter transmits the light emitted from the laser in any environment in a range from room temperature (25° C.) to 120° C.

The thermal expansion coefficients of the first cholesteric liquid crystal layer to the sixth cholesteric liquid crystal layer provided in each bandpass filter of Examples 1 to 17 were measured by the above-mentioned method and found to be all 50 ppm/° C. or more.

Example 20

An all-optical bandpass filter 20 of Example 20 was prepared according to the method described in Example 1, except that the following step 3 was carried out between (Step 1) and (Step 2) in the section of [Formation of bandpass filter for dextrorotatory circularly polarized light] of Example 1.

Step 3

The composition layer in which the liquid crystal compound was aligned was irradiated with light having a wavelength of 365 nm using a light source (2UV TRANSILLUMINATOR, manufactured by UVP, Inc.) through a cut filter in which the light transmittance of light having a wavelength of 365 nm was attenuated toward an in-plane central portion, at room temperature (25° C.) and in an oxygen atmosphere.

As a result, it was confirmed that a radial in-plane gradient, in which the reflection center wavelength shifts to a long wavelength side as a distance from an in-plane central portion toward a peripheral portion increases, was formed in each cholesteric liquid crystal layer of the obtained all-optical bandpass filter 20.

As shown in FIG. 3, using the all-optical bandpass filter 1 prepared in Example 1 and the all-optical bandpass filter 20 of Example 20 having the above-mentioned in-plane gradient, a convex lens was installed in front of each bandpass filter, and laser light having a wavelength of 905 nm was applied to the bandpass filter through the convex lens.

In a case where the all-optical bandpass filter 1 of Example 1 was used, the laser light having a wavelength of 905 nm was transmitted in the vicinity of the central portion, but in the peripheral portion away from the central portion, the incidence angle of the laser light on the all-optical bandpass filter 1 increased due to refraction in a case of passing through the lens, and as a result, the laser light was reflected and did not pass through.

On the other hand, in a case where the all-optical bandpass filter 20 of Example 20 was used, it was confirmed that the laser light was transmitted not only in the vicinity of the central portion but also in the peripheral portion where the laser light having a large incidence angle was incident.

EXPLANATION OF REFERENCES

10, 12, 14: bandpass filter
20, 24: reflective member A
22, 26: reflective member B
31: first cholesteric liquid crystal layer
32: second cholesteric liquid crystal layer
33: third cholesteric liquid crystal layer
34: fourth cholesteric liquid crystal layer
35: fifth cholesteric liquid crystal layer
36: sixth cholesteric liquid crystal layer
40: lens
100: transmission band
200, 300: reflection band

What is claimed is:

1. A bandpass filter comprising:
   a reflective member A; and
   a reflective member B,
   wherein a difference between a reflection center wavelength of the reflective member A and a reflection center wavelength of the reflective member B is larger than a sum of a half width at half maximum of a reflection band of the reflective member A and a half width at half maximum of a reflection band of the reflective member B;
   the reflective member A has a first cholesteric liquid crystal layer and a second cholesteric liquid crystal layer, and birefringence $\Delta n1$ of the first cholesteric liquid crystal layer is larger than birefringence $\Delta n2$ of the second cholesteric liquid crystal layer; and
   the reflective member B has a third cholesteric liquid crystal layer and a fourth cholesteric liquid crystal layer, and birefringence $\Delta n3$ of the third cholesteric liquid crystal layer is larger than birefringence $\Delta n4$ of the fourth cholesteric liquid crystal layer.

2. The bandpass filter according to claim 1,
   wherein a ratio of the birefringence $\Delta n2$ to the birefringence $\Delta n1$ is more than 0.3 and less than 0.7, and
   a ratio of the birefringence $\Delta n4$ to the birefringence $\Delta n3$ is more than 0.3 and less than 0.7.

3. The bandpass filter according to claim 1,
   wherein a ratio of a thickness d2 of the second cholesteric liquid crystal layer to a thickness d1 of the first cholesteric liquid crystal layer is 0.1 to 1.0, and
   a ratio of a thickness d4 of the fourth cholesteric liquid crystal layer to a thickness d3 of the third cholesteric liquid crystal layer is 0.1 to 1.0.

4. The bandpass filter according to claim 1,
   wherein the reflection center wavelength of the reflective member A and the reflection center wavelength of the reflective member B are both 600 nm or more.

5. The bandpass filter according to claim 1,
   wherein a full width at half maximum of a transmission band of the bandpass filter existing between the reflection band of the reflective member A and the reflection band of the reflective member B is included in a range of 1.5% to 15.0% of a transmission center wavelength of the transmission band.

6. The bandpass filter according to claim 1,
   wherein a thermal expansion coefficient of the first cholesteric liquid crystal layer is 50 ppm/° C. or more, and
   a thermal expansion coefficient of the third cholesteric liquid crystal layer is 50 ppm/° C. or more.

7. The bandpass filter according to claim 1,
   wherein a reflection center wavelength $\lambda_A$ of the reflective member A and a reflection center wavelength $\lambda_B$ of the reflective member B increase as a distance from a central portion increases in at least one in-plane direction.

8. A sensor comprising:
   a light source;
   the bandpass filter according to claim 1 that transmits light having an emission peak wavelength of the light source; and
   a light-receiving element that receives the light transmitted by the bandpass filter.

* * * * *